(12) United States Patent
Chen et al.

(10) Patent No.: US 10,228,799 B2
(45) Date of Patent: Mar. 12, 2019

(54) PRESSURE SENSING TOUCH SYSTEMS AND METHODS

(71) Applicant: CORNING INCORPORATED, Corning, NY (US)

(72) Inventors: Minghan Chen, Saint Johns, FL (US); Jacques Gollier, Redmond, WA (US); Ming-Jun Li, Horseheads, NY (US); Paul Francis Michaloski, Rochester, NY (US); William James Miller, Horseheads, NY (US); Daniel Aloysius Nolan, Corning, NY (US)

(73) Assignee: CORNING INCORPORATED, Corning, NY (US)

( * ) Notice: Subject to any disclaimer, the term of this patent is extended or adjusted under 35 U.S.C. 154(b) by 0 days.

(21) Appl. No.: 15/591,528

(22) Filed: May 10, 2017

(65) Prior Publication Data

US 2017/0336919 A1  Nov. 23, 2017

Related U.S. Application Data

(63) Continuation of application No. 14/043,158, filed on Oct. 1, 2013.
(Continued)

(51) Int. Cl.
*G06F 3/044* (2006.01)
*G06F 3/042* (2006.01)
*G06F 3/045* (2006.01)

(52) U.S. Cl.
CPC ............ *G06F 3/0421* (2013.01); *G06F 3/044* (2013.01); *G06F 3/045* (2013.01)

(58) Field of Classification Search
CPC ...... G06F 3/041; G06F 3/04883; G06F 3/044; G06F 2203/04103; G06F 3/0488; G06F 3/0418; G06F 2203/04102; G06F 3/016
See application file for complete search history.

(56) References Cited

U.S. PATENT DOCUMENTS 3,673,327 A  6/1972 Johnson et al.
4,484,179 A  11/1984 Kasday
(Continued)

FOREIGN PATENT DOCUMENTS

CN  102004339 A  4/2011
DE  10139147 A1  3/2003
(Continued)

OTHER PUBLICATIONS

International Search Report and Written Opinion of The International Searching Authority; PCT/US2013/041939; dated Aug. 9, 2013; 11 Pages; European Patent Office.
(Continued)

*Primary Examiner* — Olga V Merkoulova

(57) ABSTRACT

Pressure-sensing touch systems and methods are disclosed for sensing the occurrence of a touch event based on pressure applied at a touch location. The touch system includes a light-source system and a detector system operably adjacent respective input and output edges of a waveguide. Pressure at a touch location on the waveguide gives rise to a touch event causes the waveguide to bend or flex. The waveguide bending causes a change in the optical paths of light traveling by FTIR, causing the light distribution in the output light to change. The changes are detected and are used to determine whether a touch event occurred, as well as the time-evolution of the touch event. The changes in the output light can include polarization changes caused by birefringence induced in the waveguide by the applied pressure applied. Various detector configurations are disclosed for sensing the location and pressure of a touch event.

27 Claims, 38 Drawing Sheets

Related U.S. Application Data

(60) Provisional application No. 61/744,877, filed on Oct. 4, 2012.

(56) References Cited

U.S. PATENT DOCUMENTS

| | | |
|---|---|---|
| 4,511,760 A | 4/1985 | Garwin et al. |
| 4,542,375 A | 9/1985 | Alles et al. |
| 4,687,885 A | 8/1987 | Talmage, Jr. et al. |
| 4,710,760 A | 12/1987 | Kasday |
| 4,725,978 A | 2/1988 | Fujioka |
| 4,733,068 A | 3/1988 | Thiele et al. |
| 4,834,480 A | 5/1989 | Baker et al. |
| 4,974,933 A | 12/1990 | Ainslie et al. |
| 5,035,734 A | 7/1991 | Honkanen et al. |
| 5,177,802 A * | 1/1993 | Fujimoto ............ A61B 5/1172 356/71 |
| 5,222,400 A | 6/1993 | Hilton |
| 5,295,205 A | 3/1994 | Miller et al. |
| 5,351,325 A | 9/1994 | Miller et al. |
| 5,446,480 A | 8/1995 | Yoshida |
| 5,610,629 A | 3/1997 | Baur |
| 5,712,937 A | 1/1998 | Asawa et al. |
| 5,943,458 A | 8/1999 | Miller |
| 6,031,520 A | 2/2000 | De Gotari |
| 6,084,571 A | 7/2000 | De Gotari |
| 6,326,948 B1 | 12/2001 | Kobachi et al. |
| 6,504,530 B1 | 1/2003 | Wilson et al. |
| 6,556,149 B1 | 4/2003 | Reimer et al. |
| 6,788,295 B1 | 9/2004 | Inkster |
| 6,804,012 B2 | 10/2004 | Gombert |
| 6,816,537 B2 | 11/2004 | Liess |
| 6,862,396 B2 | 3/2005 | Dickson et al. |
| 6,900,795 B1 | 3/2005 | Knight, III et al. |
| 7,042,371 B2 | 5/2006 | Tervonen et al. |
| 7,157,649 B2 | 1/2007 | Hill |
| 7,158,054 B2 | 1/2007 | Pihlaja |
| 7,417,627 B2 | 8/2008 | Cok |
| 7,465,914 B2 | 12/2008 | Eliasson et al. |
| 7,515,140 B2 | 4/2009 | Philipp |
| 7,666,511 B2 | 2/2010 | Ellison et al. |
| 7,685,538 B2 | 3/2010 | Fleck et al. |
| 7,786,978 B2 | 8/2010 | Lapstun et al. |
| 7,805,036 B2 | 9/2010 | Juni |
| 7,903,090 B2 | 3/2011 | Soss et al. |
| 7,920,124 B2 | 4/2011 | Tokita et al. |
| 8,049,739 B2 | 11/2011 | Wu et al. |
| 8,075,999 B2 | 12/2011 | Barefoot et al. |
| 8,120,595 B2 | 2/2012 | Kukulj et al. |
| 8,130,210 B2 | 3/2012 | Saxena et al. |
| 8,158,543 B2 | 4/2012 | Dejneka et al. |
| 8,179,375 B2 | 5/2012 | Ciesla et al. |
| 8,187,987 B2 | 5/2012 | Amin et al. |
| 8,253,712 B2 | 8/2012 | Klinghult |
| 8,325,158 B2 | 12/2012 | Yatsuda et al. |
| 8,368,677 B2 | 2/2013 | Yamamoto |
| 8,378,975 B2 | 2/2013 | Yoon et al. |
| 8,390,481 B2 | 3/2013 | Pance et al. |
| 8,395,601 B2 | 3/2013 | Nho et al. |
| 8,411,068 B2 | 4/2013 | Lu et al. |
| 8,553,014 B2 | 10/2013 | Holmgren et al. |
| 8,674,963 B2 | 3/2014 | Cornish et al. |
| 9,046,961 B2 | 6/2015 | King et al. |
| 9,213,445 B2 | 12/2015 | King et al. |
| 9,274,600 B2 | 3/2016 | Anastas et al. |
| 9,405,382 B2 | 8/2016 | Drumm et al. |
| 2001/0005004 A1 * | 6/2001 | Shiratsuki .......... G06K 7/10683 250/566 |
| 2001/0007449 A1 | 7/2001 | Kobachi et al. |
| 2002/0154250 A1 | 10/2002 | An |
| 2003/0026971 A1 | 2/2003 | Inkster et al. |
| 2004/0252091 A1 * | 12/2004 | Ma ...................... G06F 3/0421 345/87 |
| 2006/0096392 A1 | 5/2006 | Inkster et al. |
| 2007/0125937 A1 * | 6/2007 | Eliasson ............... G06F 3/0414 250/221 |
| 2007/0201042 A1 | 8/2007 | Eliasson et al. |
| 2007/0211985 A1 | 9/2007 | Duer |
| 2008/0068343 A1 | 3/2008 | Hoshino et al. |
| 2008/0088597 A1 | 4/2008 | Prest et al. |
| 2008/0088600 A1 | 4/2008 | Prest et al. |
| 2008/0252619 A1 | 10/2008 | Crockett et al. |
| 2008/0284742 A1 | 11/2008 | Prest et al. |
| 2008/0284925 A1 | 11/2008 | Han |
| 2008/0289884 A1 | 11/2008 | Elwell |
| 2008/0303797 A1 | 12/2008 | Grothe |
| 2009/0015564 A1 | 1/2009 | Ye et al. |
| 2009/0124024 A1 | 5/2009 | Kasai et al. |
| 2009/0219253 A1 | 9/2009 | Izadi et al. |
| 2009/0219261 A1 | 9/2009 | Jacobson et al. |
| 2009/0322677 A1 | 12/2009 | Lee et al. |
| 2010/0001978 A1 | 1/2010 | Lynch et al. |
| 2010/0060548 A1 | 3/2010 | Choi et al. |
| 2010/0079264 A1 | 4/2010 | Hoellwarth |
| 2010/0103123 A1 | 4/2010 | Cohen et al. |
| 2010/0103140 A1 * | 4/2010 | Hansson ............... G06F 3/0421 345/175 |
| 2010/0117974 A1 | 5/2010 | Joguet et al. |
| 2010/0117989 A1 | 5/2010 | Chang |
| 2010/0141557 A1 | 6/2010 | Gruhlke et al. |
| 2010/0156847 A1 | 6/2010 | No et al. |
| 2010/0171717 A1 | 7/2010 | Hu et al. |
| 2010/0207906 A1 | 8/2010 | Anglin et al. |
| 2010/0245288 A1 | 9/2010 | Harris |
| 2010/0253650 A1 | 10/2010 | Dietzel et al. |
| 2010/0302185 A1 | 12/2010 | Han et al. |
| 2010/0321310 A1 | 12/2010 | Kim et al. |
| 2010/0328270 A1 | 12/2010 | Lin et al. |
| 2011/0012867 A1 | 1/2011 | Lee |
| 2011/0032214 A1 | 2/2011 | Gruhlke et al. |
| 2011/0122091 A1 * | 5/2011 | King ..................... G06F 3/0421 345/175 |
| 2011/0141053 A1 | 6/2011 | Bulea et al. |
| 2011/0157092 A1 | 6/2011 | Yang |
| 2011/0169782 A1 | 7/2011 | Goertz et al. |
| 2011/0298742 A1 | 12/2011 | Dingnan |
| 2014/0035836 A1 | 2/2012 | Mueller et al. |
| 2012/0068939 A1 | 3/2012 | Peberton-Pigott |
| 2012/0068970 A1 | 3/2012 | Peberton-Pigott |
| 2012/0068971 A1 | 3/2012 | Peberton-Pigott |
| 2012/0071206 A1 | 3/2012 | Peberton-Pigott |
| 2012/0092250 A1 | 4/2012 | Hadas et al. |
| 2012/0098795 A1 | 4/2012 | Lu et al. |
| 2012/0176345 A1 | 7/2012 | Ye et al. |
| 2012/0212451 A1 | 8/2012 | Large et al. |
| 2012/0242607 A1 | 9/2012 | Ciesla et al. |
| 2012/0326981 A1 | 12/2012 | Kurose |
| 2013/0107306 A1 | 5/2013 | Yoon et al. |
| 2013/0135254 A1 | 5/2013 | Lee et al. |
| 2013/0285977 A1 | 10/2013 | Baharav et al. |
| 2014/0055421 A1 | 2/2014 | Christiansson et al. |
| 2014/0098306 A1 * | 4/2014 | King ....................... G06F 3/042 349/12 |

FOREIGN PATENT DOCUMENTS

| | | |
|---|---|---|
| EP | 0901233 | 3/1999 |
| EP | 0901299 B1 | 6/2007 |
| EP | 2392904 A1 | 7/2011 |
| EP | 2437144 A1 | 4/2012 |
| EP | 2437145 A1 | 4/2012 |
| EP | 2439619 A1 | 11/2012 |
| EP | 2439620 A1 | 11/2012 |
| FR | 2963839 A1 | 2/2012 |
| GB | 2313195 A | 11/1997 |
| JP | 2011103094 A | 5/2011 |
| TW | 436872 U1 | 9/2012 |
| WO | 1983003314 | 9/1983 |
| WO | 2002035460 A1 | 5/2002 |
| WO | 2006134552 A2 | 12/2006 |
| WO | 2010063320 A1 | 6/2010 |
| WO | 2011111033 A1 | 9/2011 |
| WO | 2012027599 A2 | 3/2012 |
| WO | 2012087286 A1 | 6/2012 |

(56) References Cited

FOREIGN PATENT DOCUMENTS

| WO | 2013029641 A1 | 3/2013 |
|---|---|---|
| WO | 2013037385 A1 | 3/2013 |
| WO | 2013068651 A2 | 5/2013 |

OTHER PUBLICATIONS

International Search Report and Written Opinion PCT/US2013/063355 dated Mar. 5, 2014.
Lapointe et al. "Making smart phones smarter with photonics", published Jun. 18, 2014, vol. 22, No. 13. 11 pgs.
Nolan, "Multiply Tapered Fiber Devices" OSA/WDM Components 1999, vol. 29, pp. 95-100.
Pochi, "Optical waves in layered media," A Wiley Interscience Publication, Sysmetrical Slabe Waveguides, p. 299-318.
TW102118090 Search Report dated Feb. 14, 2017, Taiwan Patent Office.
TW102136054 Search Report dated Dec. 20, 2016, Taiwan Patent Office.
Vassallo "Optical Waveguide Concepts" Chapter 5, Elsevier, p. 228-231.
English Translation of CN201380063433.5 Second Office Action dated Dec. 25, 2017, China Patent Office, 13 pgs.

\* cited by examiner

In a single axis stress state the stress optical coefficient K is defined by the following equation $$\Delta s = (n_\parallel - n_\perp)d = (K_\parallel - K_\perp)d\sigma = K d\sigma$$

with:
- $\Delta s$    Difference in optical path
- $d$    Light path length in the sample
- $n_\parallel$    Refractive index for oscillating light parallel to the direction of stress
- $n_\perp$    Refractive index for oscillating light perpendicular to the direction of stress
- $K_\parallel$    $(n_\parallel - n_0)/\sigma$
- $K_\perp$    $(n_\perp - n_0)/\sigma$
- $n_0$    Refractive index of the unstressed glass
- $\sigma$    Mechanical stress (positive for tensile stress)

The unit of the stress optical coefficient K is $mm^2 N^{-1}$, the unit of the stress is $Nmm^{-2}$ or more common MPa.

*FIG. 28A*

Figure 6: Change in refractive index in relation to external compressive and/or tensile load.

| | |
|---|---|
| 1 PSI (N/mm^2) | 6.89E-03 |
| | |
| K for BK7 (mm^2/N) | 2.77E-06 |
| K for FS (mm^2/N) | 3.50E-06 |

| Pressure | |
|---|---|
| Pa = Pascal (N/m^2) | |
| 1 Pa (PSI) | 1.45E-04 |
| 1 PSI (Pa) | 6.89E+03 |
| 1 PSI (N/mm^2) | 6.89E-03 |
| 1 kPa (N/mm^2) | 0.001 |
| 1 PSI (kPa) | 6.895 |

- Using Pencil-eraser (120 mm²)
- Pressing, releasing, and then again, 3 times.
- Measured known applied pressures:
    - 5.45 kPa :: 'Finger laying on the surface'
    - 10.9 kPa :: 'Pressing like key-board'
    - 16.3 kPa :: 'Pressing hard on Keyboard'

(5.45 kPa ~= 67 grams/ 2.4oz on the eraser)

- Clearly distinguish different events.
- Similar results for finger.
- This method will only give relative-change in pressure. (Non linear relative-change)

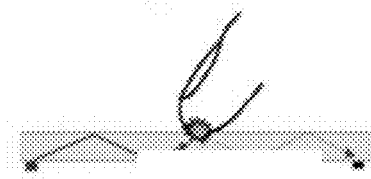
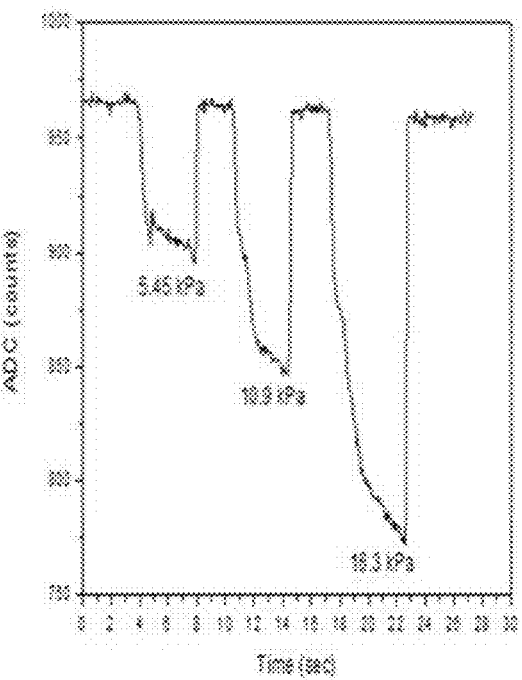

FIG. 28C

PRESSURE SENSING TOUCH SYSTEMS AND METHODS

CROSS-REFERENCE TO RELATED APPLICATIONS

This application is a continuation of U.S. patent application Ser. No. 14/043,158 filed on Oct. 1, 2013 (now abandoned), which claims the benefit of priority under 35 U.S.C. § 119 of U.S. Provisional Application Ser. No. 61/744,877, filed on Oct. 4, 2012, the content of these applications being relied upon and incorporated herein by reference in their entirety, and the benefit of priority under 35 U.S.C. § 120 is hereby claimed.

FIELD

The present disclosure relates to touch-sensitive devices, and in particular to touch systems and methods capable of sensing a touch event at a touch location based on applied pressure at the touch location.

BACKGROUND ART

The market for displays and other devices (e.g., keyboards) having non-mechanical touch functionality is rapidly growing. As a result, touch-sensing techniques have been developed to enable displays and other devices to have touch functionality. Touch-sensing functionality is gaining wider use in mobile device applications, such as smart phones, e-book readers, laptop computers, tablet computers and like devices.

Touch systems in the form of touch screens have been developed that respond to a variety of types of touches, such as single touches, multiple touches, swiping, finger touches and stylus touches. Some of these systems rely on light-scattering and/or light attenuation. While effective, there remains a need for alternative optics-based approaches to touch-sensing that can sense a touch event based on the pressure applied at the touch location.

SUMMARY

The present disclosure relates to touch-sensitive devices, and in particular to touch systems that detect a touch event based pressure applied at the touch location of the touch event. Aspects of the systems and methods take advantage of the deflection, steering or other alternation of light traveling within a waveguide when pressure is applied to the waveguide. The alterations of the light beam include changing the beam path, splitting the beam into multiple beams, creating interference between multiple beams, creating multiple output light beams, and changing the polarization state of the input light beam.

Aspects of the disclosure include a touch system that employs light-bending effects and light-polarization effects. The touch system includes a light-source system and a detector system operably disposed adjacent respective input and output edges of a waveguide in the form of a transparent sheet. The waveguide can also include just a portion of the transparent sheet, e.g., an ion-exchanged or thin waveguide layer adjacent the upper surface of the transparent sheet. Pressure at a touch location on the waveguide that gives rise to a touch event causes the waveguide to bend or flex. The waveguide bending causes a change in the optical paths of FTIR light traveling in the waveguide. This in turn causes the light distribution in the output light to change. The changes in the light distribution are detected and are used to determine whether a touch event occurred, as well as the time-evolution of the touch event. The changes can include polarization changes caused by birefringence induced in the waveguide by the pressure applied at the touch location.

Aspects of the disclosure include various detector configurations are disclosed for sensing the location and pressure of a touch event, such as by detecting the movement of fringes past the detector. Also, detecting outputted light at different detectors can be employed to measure the time difference between detector signals for a given touch event, and then using the time difference to determine the touch location of the touch event. Various detector configurations and detector signal processing techniques are disclosed that determine an amount of pressure at the touch event, as well as the time evolution of the applied pressure.

Additional features and advantages of the disclosure are set forth in the detailed description that follows, and in part will be readily apparent to those skilled in the art from that description or recognized by practicing the disclosure as described herein, including the detailed description that follows, the claims, and the appended drawings.

The claims as well as the Abstract are incorporated into and constitute part of the Detailed Description set forth below.

All publications, articles, patents, published patent applications and the like cited herein are incorporated by reference herein in their entirety, including U.S. Patent Application Publication No. 2011/0122091 and U.S. Provisional Patent Applications Nos. 61/564,003, 61/564,024 and 61/640,605.

BRIEF DESCRIPTION OF THE DRAWINGS

FIGS. 28A through 28C provide supplemental information to the polarization-based embodiments described herein.

Figure 1A:
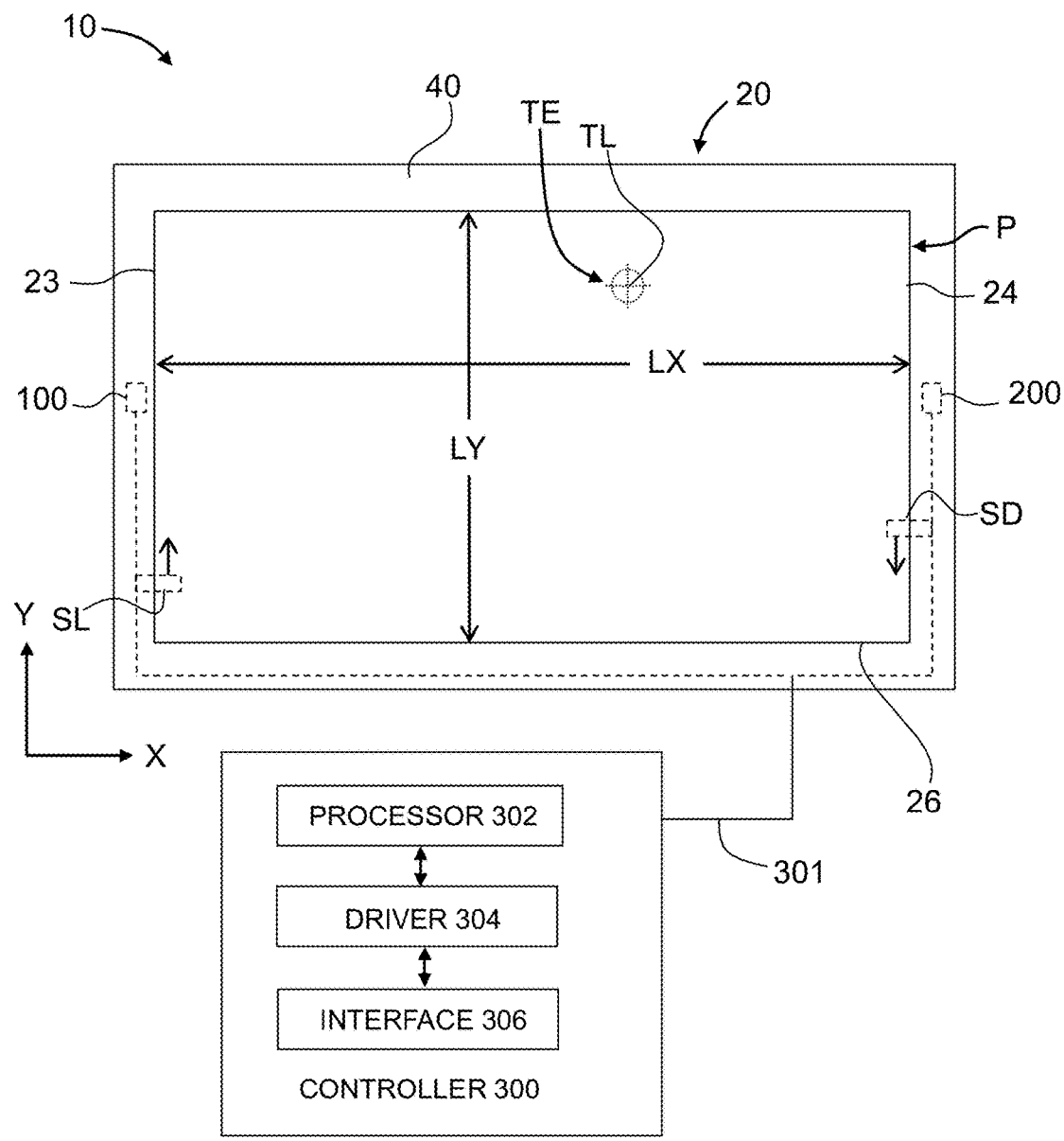
FIG. 1A is a face-on view of an example touch system according to the disclosure.

Cartesian coordinates are shown in certain of the Figures for the sake of reference and are not intended as limiting with respect to direction or orientation.

DETAILED DESCRIPTION

The present disclosure can be understood more readily by reference to the following detailed description, drawings, examples, and claims, and their previous and following description. However, before the present compositions, articles, devices, and methods are disclosed and described, it is to be understood that this disclosure is not limited to the specific compositions, articles, devices, and methods disclosed unless otherwise specified, as such can, of course, vary. It is also to be understood that the terminology used herein is for the purpose of describing particular aspects only and is not intended to be limiting.

The following description of the disclosure is provided as an enabling teaching of the disclosure in its currently known embodiments. To this end, those skilled in the relevant art will recognize and appreciate that many changes can be made to the various aspects of the disclosure described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

Disclosed are materials, compounds, compositions, and components that can be used for, can be used in conjunction with, can be used in preparation for, or are embodiments of the disclosed method and compositions. These and other materials are disclosed herein, and it is understood that when combinations, subsets, interactions, groups, etc. of these materials are disclosed that while specific reference of each various individual and collective combinations and permutation of these compounds may not be explicitly disclosed, each is specifically contemplated and described herein.

Thus, if a class of substituents A, B, and C are disclosed as well as a class of substituents D, E, and F, and an example of a combination embodiment, A-D is disclosed, then each is individually and collectively contemplated. Thus, in this example, each of the combinations A-E, A-F, B-D, B-E, B-F, C-D, C-E, and C-F are specifically contemplated and should be considered disclosed from disclosure of A, B, and/or C; D, E, and/or F; and the example combination A-D. Likewise, any subset or combination of these is also specifically contemplated and disclosed. Thus, for example, the subgroup of A-E, B-F, and C-E are specifically contemplated and should be considered disclosed from disclosure of A, B, and/or C; D, E, and/or F; and the example combination A-D. This concept applies to all aspects of this disclosure including, but not limited to any components of the compositions and steps in methods of making and using the disclosed compositions. Thus, if there are a variety of additional steps that can be performed it is understood that each of these additional steps can be performed with any specific embodiment or combination of embodiments of the disclosed methods, and that each such combination is specifically contemplated and should be considered disclosed.

Pressure-Sensing Touch System

FIG. 1A is a schematic diagram of an example pressure-sensing touch system ("touch system") 10 according to the disclosure. The touch system 10 may be used in a variety of consumer electronic articles, for example, in conjunction with displays for cell-phones, keyboards, touch screens and other electronic devices such as those capable of wireless communication, music players, notebook computers, mobile devices, game controllers, computer "mice," electronic book readers and the like.

The example touch system 10 of FIG. 1A includes a generally planar light-guiding assembly ("assembly") 20, the details of which are described below. Assembly 20 includes a waveguide 22, with at least one light source 100 and at least one detector 200 are disposed adjacent a perimeter P of the waveguide. The at least one light source 100 and the at least one detector 200 and are optically coupled through the waveguide as explained in greater detail below.

One light source 100 and one detector 200 are shown in assembly 20 by way of example. Perimeter P includes an edge (end) 23 adjacent light source 100 and an edge (end) 24 adjacent detector 200. Perimeter P can have any reasonable shape and is shown as being rectangular by way of example. Assembly 20 can be generally rectangular and in the example shown waveguide 22 has a dimension (length) LX in the X-direction and a length LY in the Y-direction.

Figure 1B:
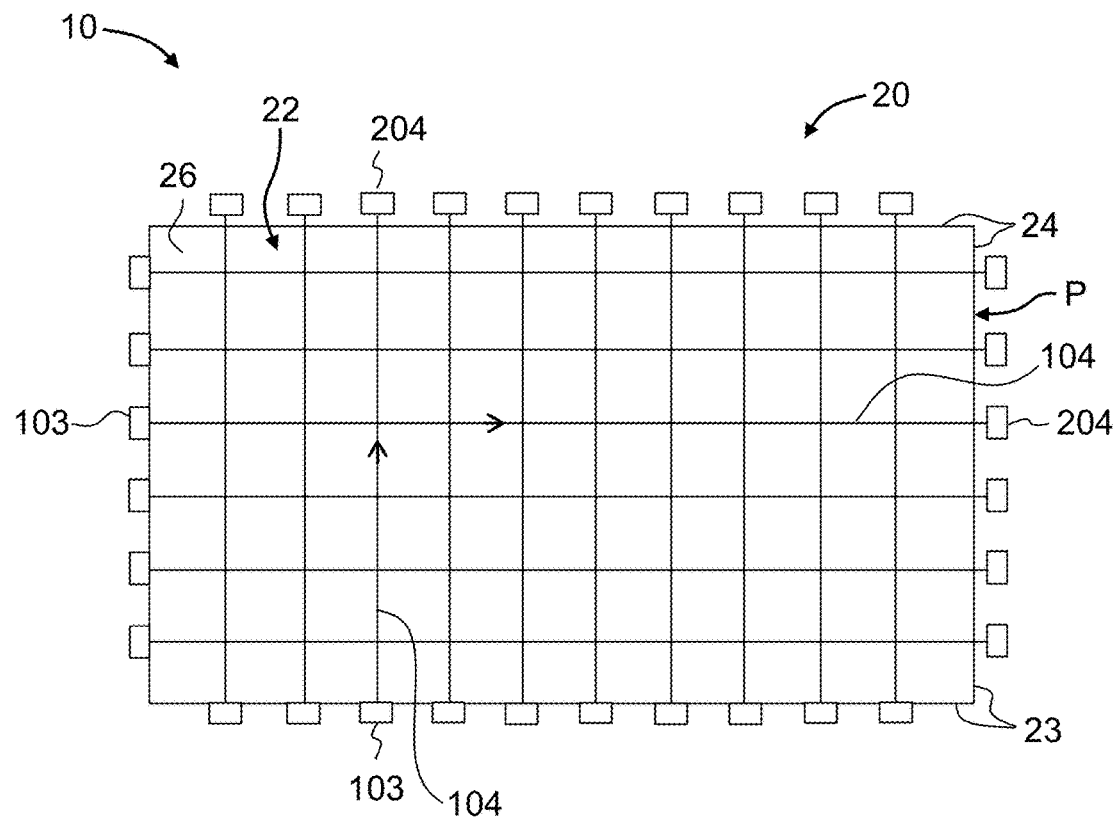
FIG. 1B is a face-on view of a portion of the touch system of FIG. 1A illustrating an example of multiple light source systems and multiple detector systems operably disposed about respective opposite edges of the waveguide.

FIG. 1B illustrates an example embodiment of system 10 wherein multiple light-sources 100 are used (or equivalently, a light source with multiple light-source elements can be used), and multiple detectors 200 are used (or equivalently, a detector with multiple detector elements. This configuration of system 10 is especially useful when the location of one or more touch events TE needs to be determined. In addition, one or more light sources 100 and one or more detectors 200 can be operably disposed in the assembly to ensure that the entire (or substantially the entire) assembly can be used to sense the pressure of a touch event. This may include, for example, cycling the activation of sets (e.g., pairs) of light sources 100 and/or detectors 200 to ensure that all possible locations for touch events are covered. In an example, the cycling can be done at a rate that is much faster than the typical duration of a touch event that applies pressure to elicit a response from touch system 10.

Example detectors 200 include photodiodes and the various types of photosensors. Example light sources 100 include LEDs, laser diodes, optical-fiber-based lasers, extended light sources, and the like.

Figure 2A:
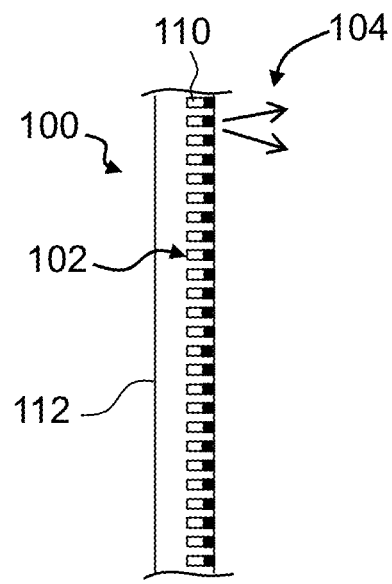
FIGS. 2A and 2B are top-down views of an example light source that includes multiple light-source elements (FIG. 2A) and an example detector that includes multiple detector elements (FIG. 2B)
Figure 2B:
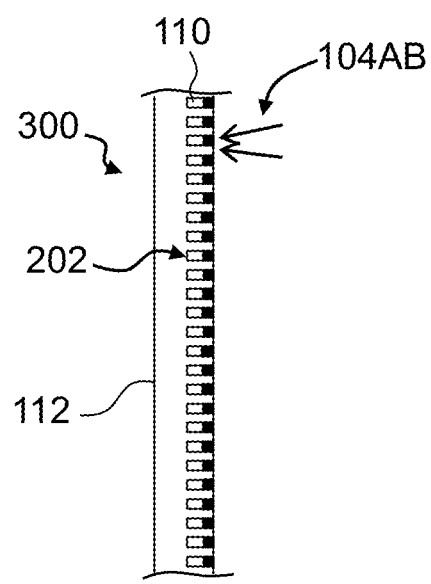

With reference to FIG. 2A, light source 100 can comprise one or more light-source elements 102 that are operably mounted on flex-circuit boards ("flex circuits") 110, which in turn are mounted to printed circuit boards (PCB) 112 arranged adjacent an edge 26 of transparent sheet 20. In the discussion herein, light source 100 can thus mean a light source having one or more light-source elements 102. Likewise, with reference to FIG. 2B, detector 200 can include a detector that has one more detector elements 202. Output light 104AB is shown incident upon one of detector elements 202. In an example, detector 200 can be a pixelated detector where detector elements 202 constitute detector pixels. An example pixelated detector 200 is a CMOS or CCD array detector.

In example embodiments of the disclosure, an amount of pressure (e.g., a relative amount of pressure) is applied to planar waveguide at touch location TL associated with a touch event TE. Aspects of the disclosure are directed to sensing the occurrence of a touch event TE, while other aspects include the additional function of determining the touch location TL of the touch event. Other aspects of the disclosure include sensing an amount of pressure applied at the touch event TE.

Figure 3:
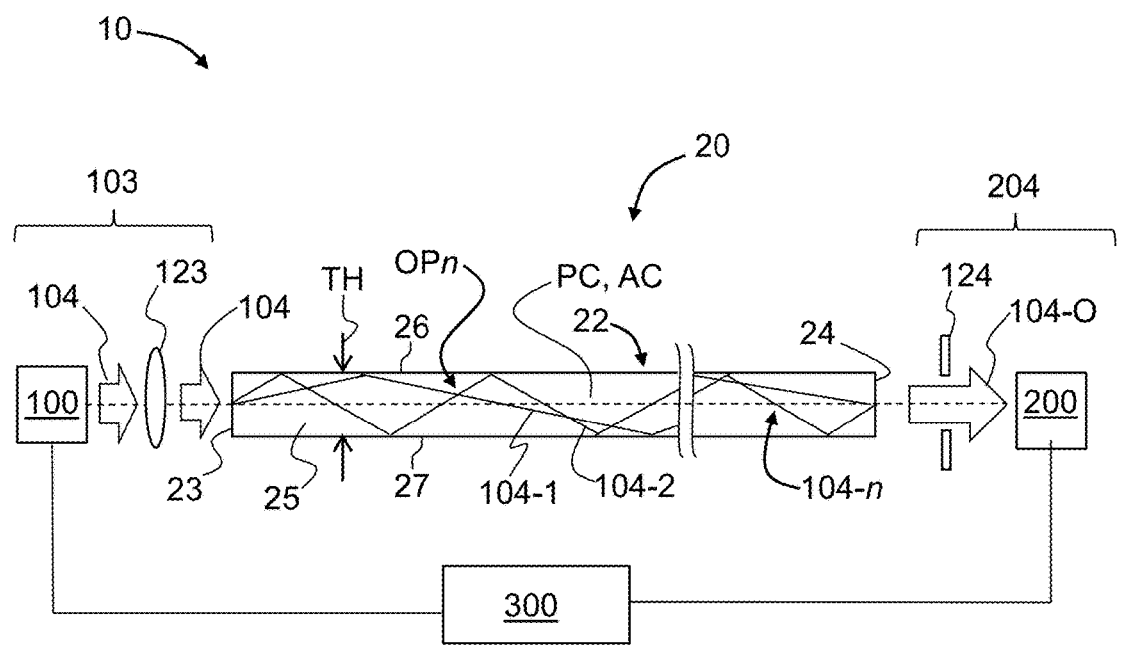
FIG. 3 is a cross-sectional view of an example embodiment of the touch system of FIG. 1A.

In an example, touch system 10 includes an optional cover 40 that serves to cover light source 100 and 200 so that they cannot be seen from above assembly 20 by a viewer (see, e.g., viewer 500, FIG. 15B). In an example, cover 40 serves the role of a bezel. In an example, cover 40 can be any type of light-blocking member, film, paint, glass, component, material, texture, structure, etc. that serves to block at least visible light and that is configured to keep some portion of touch system 10 from being viewed by a user, or that blocks one wavelength of light while transmitting another. In FIG. 3, only light sources 100, detectors 200 and waveguide 22 are shown for ease of illustration.

In example embodiments, cover 40 can reside anywhere relative to assembly 20 that serves to block a viewer from seeing light source 100 or detector 200. Cover 40 need not be contiguous and can be made of sections or segments. Further, cover 40 can be used to shield detector 200 from receiving light other than light 104 from light source 100, such as for sunlight rejection. Thus, in an example, cover can be substantially opaque at one wavelength (e.g., a visible wavelength) and substantially transparent at another wavelength (e.g., an infrared wavelength for light 104 from light source 100).

In an example, cover 40 is in the form of a film that is opaque at least at visible wavelengths and that optionally transmits at IR wavelengths. An example film for cover 40 comprises a black paint that absorbs light over a wide range of wavelengths including the visible and IR wavelengths.

With continuing reference to FIG. 1, touch system 10 may include a controller 300 that is operably connected (e.g., via a bus 301) to the one or more light sources 100 and the one or more detectors 200. Controller 300 is configured to control the operation of touch system 10. In some embodiments, the controller 300 includes a processor 302, a device driver 304 and interface circuit 306, all operably arranged. Controller controls light source 100 via a light-source signal SL and also receives and processes a detector signal SD from detector 200.

In an example embodiment, light source 100 is wavelength modulated via processor 302 of controller 300 via light source control signal SL. This causes a change in output light beam 104-O by changing the optical paths OPn of light beam 104 in a select manner. This select change manifests itself in detector signal SD, which is processed (filtered) by controller 300 to bring out the laser modulation frequency. This can be accomplished, for example, by a lock-in amplifier.

In an example, controller 300 comprises a microcontroller or a computer that executes instructions stored in firmware and/or software (not shown). Controller 300 is programmable to perform functions described herein, including the operation of the touch system and any signal processing that is required to measure, for example, relative amounts of pressure, as well as the location of a touch event, or multiple touch events and multiple pressures. As used herein, the term computer is not limited to just those integrated circuits referred to in the art as computers, but broadly refers to computers, processors, microcontrollers, microcomputers, programmable logic controllers, application-specific integrated circuits, and other programmable circuits, and these terms are used interchangeably herein.

Software may implement or aid in performing the pressure-sensing functions and operations disclosed herein. The software may be operably installed in controller 300 or processor 302. Software functionalities may involve programming, including executable code, and such functionalities may be used to implement the methods disclosed herein. Such software code is executable by the general-purpose computer or by the processor unit described below.

In operation, the code and possibly the associated data records are stored within a general-purpose computer platform, within the processor unit, or in local memory. At other times, however, the software may be stored at other locations and/or transported for loading into the appropriate general-purpose computer systems. Hence, the embodiments discussed herein involve one or more software products in the form of one or more modules of code carried by at least one machine-readable medium. Execution of such code by a processor of the computer system or by the processor unit enables the platform to implement the catalog and/or software downloading functions, in essentially the manner performed in the embodiments discussed and illustrated herein.

The computer and/or processor as discussed below may each employ a computer-readable medium or machine-readable medium, which refers to any medium that participates in providing instructions to a processor for execution, including for example, determining an amount of pressure associated with a touch event, as explained below. Any memory discussed below constitutes a computer-readable medium. Such a medium may take many forms, including but not limited to, non-volatile media, volatile media, and transmission media. Non-volatile media include, for example, optical or magnetic disks, such as any of the storage devices in any computer(s) operating as one of the server platforms, discussed above. Volatile media include dynamic memory, such as main memory of such a computer platform. Physical transmission media include coaxial cables; copper wire and fiber optics, including the wires that comprise a bus within a computer system.

Common forms of computer-readable media therefore include, for example: a floppy disk, a flexible disk, hard disk, magnetic tape, any other magnetic medium, a CD-ROM, DVD, any other optical medium, less commonly used media such as punch cards, paper tape, any other physical medium with patterns of holes, a RAM, a PROM, and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

FIG. 3 is a cross-sectional view of example system 10. System 10 has a waveguide 22 that in an example is in the form of a thin, transparent sheet. Waveguide 22 has an input edge 23 and an output edge 24. Light source 100 is arranged adjacent input edge 23 while detector is arranged adjacent output edge 24. Waveguide 22 has a body 25 that is substantially transparent to the wavelength $\lambda$ of light 104 ("the operating wavelength") emitted by light source 100. Waveguides 22 has an upper surface 26 and a lower surface 27 separated by a thickness TH. Waveguide 22 has a central plane PC that is parallel to upper and lower surfaces and midway therebetween. Light source 100 and detector 200 lie along a central axis AC that lights in central plane PC.

In other embodiments, materials other than glass can be used for waveguide 22, such as polymers, plastics and other non-glass materials that are substantially transparent at the operating wavelength $\lambda$.

System 10 includes an input optical system 123 operably arranged between light source 100 and input edge 23. Input optical system 123 is configured to receive (coherent) light 104 and direct it into waveguide 22. System 10 also includes an output optical system 124 operably arranged between light source 100 and output edge 24. Output optical system 124 is configured to receive output light 104-O and either direct it or allow it to pass to detector 200. In an example, output optical system 124 includes a diaphragm (stop) as shown. Output optical system 124 can also include other light-directing or light-conditioning elements or components, such as lens elements, mirrors, etc.

The combination of light source 100 and input optical system 123 defines a light source system 103 while the combination of detector 200 and output optical system 124 defines a detector system 204. Light source system 103, detector system 204 and waveguide 22 constitute a touch-screen assembly 20.

FIG. 3 illustrates an example embodiment where detector system 204 is aperture limited so that detector 200 only detects a limited portion of light 104-O that exits output edge 24 (i.e., output light 104-O). This allows detector 200 to detect a local change in the variation of intensity in output light 104-O, as opposed to collecting essentially all of the light and obtaining an integrated measurement that will not substantially change. This is because the perturbation of waveguide 22 generally results on a redistribution of light within the waveguide.

To efficiently detect the redistribution of light 104, the size of the aperture 124 needs to be smaller than the thickness TH of the waveguide 20. This can be achieved by either using an aperture 124 in conjunction with a detector larger than the waveguide thickness, or by using only a detector having a size smaller than the waveguide thickness. Aperture 124 can be circular, but can be rectangular to optimize the power collection efficiency.

In other embodiments as discussed above, detector 200 is pixelated so that a measurement of a large portion of output light 104-O includes being able to sense the distribution of light in the interference pattern (i.e., the light and dark fringes) so that changes in the pattern can be detected when touch events TE occur. Thus, in one example embodiment, one or more portions of output edge 24 are imaged onto detector 200, which includes the case of placing detectors 200 at different locations right up against the output edge. Detector 200 can also have a photosensing surface that has a dimension smaller than the waveguide thickness TH System 10 is configured so that light beam 104 travels through waveguide 22 from input edge 23 to output edge 24 over multiple optical paths OPn associated with light rays 104-$n$, where n is an integer and equal to or greater than 2. In FIG. 3, two of optical paths OPn are represented by two light rays 104-1 and 104-2 of light rays 104-$n$ by way of illustration. In an example, the number n of different optical paths correspond to the number n of light rays that undergo a different number of total-internal reflections ("bounces") when traveling between input and output edges 23 and 24. Light rays 104-$n$ are used to represent the different TI R guided modes for ease of illustration, and the terms "light rays" and "guided modes" can be used interchangeably.

One skilled in the art will appreciate that the guided modes represented by the n light rays 104-$n$ are capable of optical interference. To this end, output optical system 124 is configured to receive n light rays 104-$n$ that exit output edge 24 and combine the light rays (guided modes) so that they interfere, thereby forming an output light beam 104-O. The output light beam 104-O is directed to detector 200, which detects the output light beam.

From an electromagnetic viewpoint, when light 104 is launched into waveguide 22, the total electrical field E can be represented by:

$$E = \Sigma E_n \exp(-i\beta_n z) \quad (1)$$

where $E_n$ and $\beta_n$ are the electrical field distribution and propagation constant of mode n respectively. The light intensity is given by:

$$I \propto E_1^2 + E_2^2 + \ldots + E_1 E_2 \cos(\Delta\beta_{12}z) + E_1 E_3 \cos(\Delta\beta_{13}z) + \ldots E_m E_n \cos(\Delta\beta_{mn}z) \quad (2)$$

where is $\Delta\beta$ is the propagation constant difference between modes n and m.

Due to the phase differences among different modes, Eq. (2) shows that interference will arise at output edge 24 of waveguide 22. The phase difference is very sensitive to external perturbations to waveguide 22, such as bending, pressure etc. This effect can be used in system 10 to enable force-sensitive or pressure-sensitive touch applications.

In some embodiments, at least one of light rays 104-$n$ represent the lowest-order mode of waveguide 22, while the other light rays represent higher-order modes. The lowest-order mode of waveguide 22 travels directly along central axis A1 without undergoing any bounces. Thus, input and output optical systems 123 and 124 can also be referred to as mode conditioners, since they are respectively used to excite guided moves and detect interfered guided modes.

The configuration of touch-screen assembly ("assembly") 20 defines an interferometer wherein light rays 104-$n$ travel over the aforementioned different optical paths OPn and interfere. The optical paths OPn overlap within body 25 of waveguide 22.

Waveguide 22 may generally be made of any suitably transparent material that can be formed into a thin planar sheet, such as plastic, acrylic, glass, etc., and that supports the transmission of light beam 104-$n$ without substantial loss due to scattering or absorption. In an example embodiment, waveguide thickness TH such that the waveguide can flex without breaking when pressure is locally applied at upper surface 22 at touch location TL. An exemplary range for thickness TH is from 0.3 mm to 1.5 mm. Other thickness can be employed consistent with the particular application for touch system 10. In an example, only top waveguide 22A has a thickness that allows it to flex, while bottom waveguide 22B is sufficiently thick or is otherwise rigid that it retains its generally planer configuration even when the top waveguide is subject to a flexing force due to a touch event TE.

In an example embodiment, waveguide 20 may be formed from a chemically strengthened glass, such as a soda-lime-type glass. An example glass s an alkali aluminosilicate glass hardened through ion exchange. These types of glass can comprise $Na_2O$ (soda), CaO (lime) and $SiO_2$ (silica), but can also include oxides such as MgO, $Li_2O$, $K_2O$, ZnO, and $ZrO_2$. Once hardened through ion exchange, these types of glass exhibit certain characteristics that make them desirable for touch screen applications, as well as other applications (e.g., as a cover glass).

Further details as to the formulation or production, or both, of soda-lime-type glass suitable for use as waveguiding sheets may be found in one or more of U.S. patent application Ser. No. 11/888,213 filed Jul. 31, 2007; U.S. patent application Ser. No. 12/537,393 filed Aug. 7, 2009; U.S. patent application Ser. No. 12/545,475 filed Aug. 21, 2009; and U.S. patent application Ser. No. 12/392,577 filed Feb. 25, 2009. An exemplary glass for use herein is Gorilla® glass, from Corning, Incorporated, Corning, N.Y. Also, an exemplary glass, such as low-iron Gorilla® glass or other low-iron ion-exchanged glass, is transparent to an infrared operating wavelength $\lambda$.

Figure 4A:
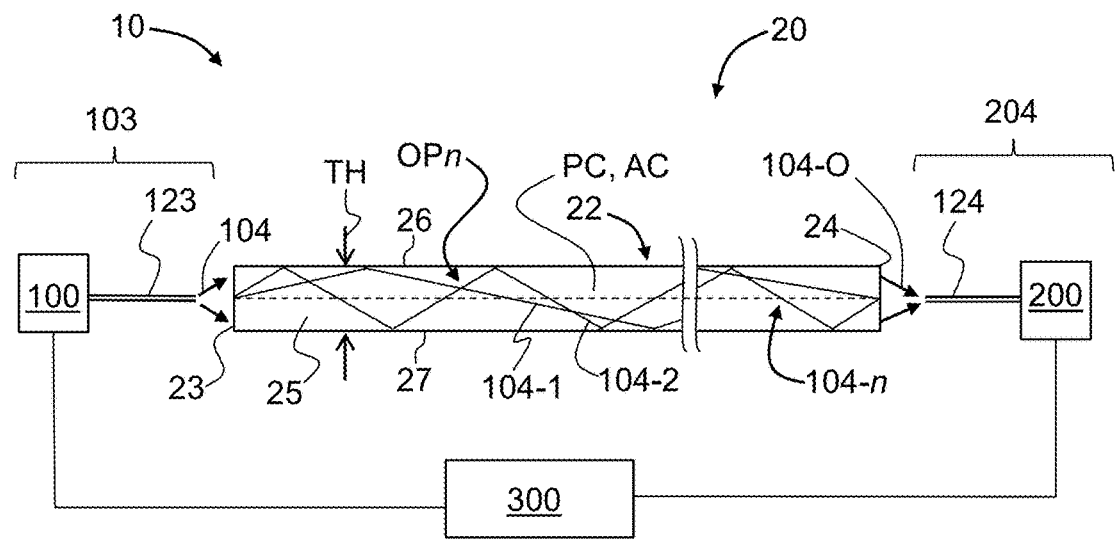
FIGS. 4A through 4D are cross-sectional views of different example embodiments of the touch system of FIG. 1A.

FIG. 4A is an example embodiment of assembly 20 based on that of FIG. 3A but wherein light-source system 103 includes a single-mode optical fiber as input optical system 123, and where detector system 204 includes either a single-mode or multimode optical fiber as output optical system 124. The single or multimode optical fiber 124 serves as an aperture-limited optical system that allows for a localized measurement of output light 104-O to be made. In an alternative embodiment, multiple optical fibers 124 can be used to compare intensities at different locations at output edge 24. This includes, for example, utilizing an optical fiber bundle.

Figure 4B:
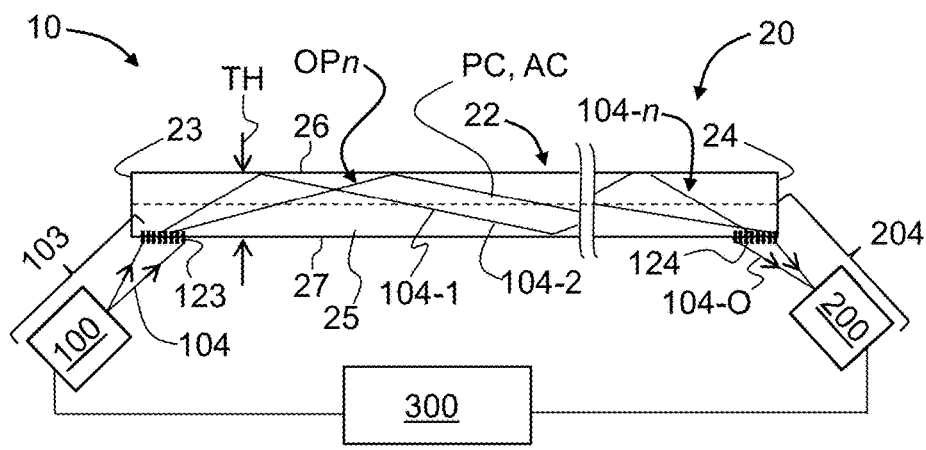

FIG. 4B is another example embodiment of assembly 20 based on that of FIG. 3A, but wherein light-source system 103 includes a grating as input optical system 123, and where detector system 204 includes a grating as output optical system 124. As discussed above, an aperture can be used adjacent detector 200 to make the detection process aperture limited and thus directed to a local intensity measurement.

Figure 4C:
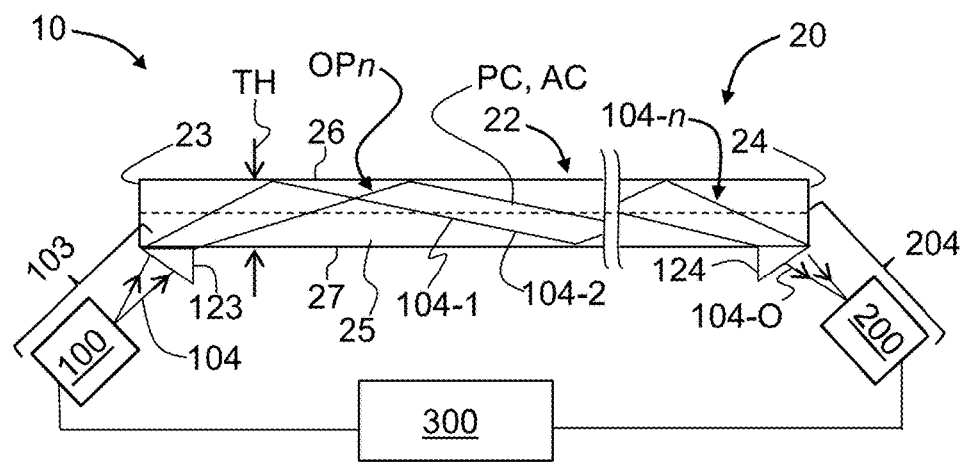

FIG. 4C is another example embodiment of assembly 20 similar to that of FIG. 4B but wherein light-source system 103 includes a prism arranged on lower surface 27 as a component of input optical system 123, and where detector system 204 includes a prism also arranged on lower surface 27 as a component of output optical system 124. As discussed above, an aperture can be used adjacent detector 200 to make the detection process aperture limited and thus directed to a local intensity measurement.

Figure 4D:
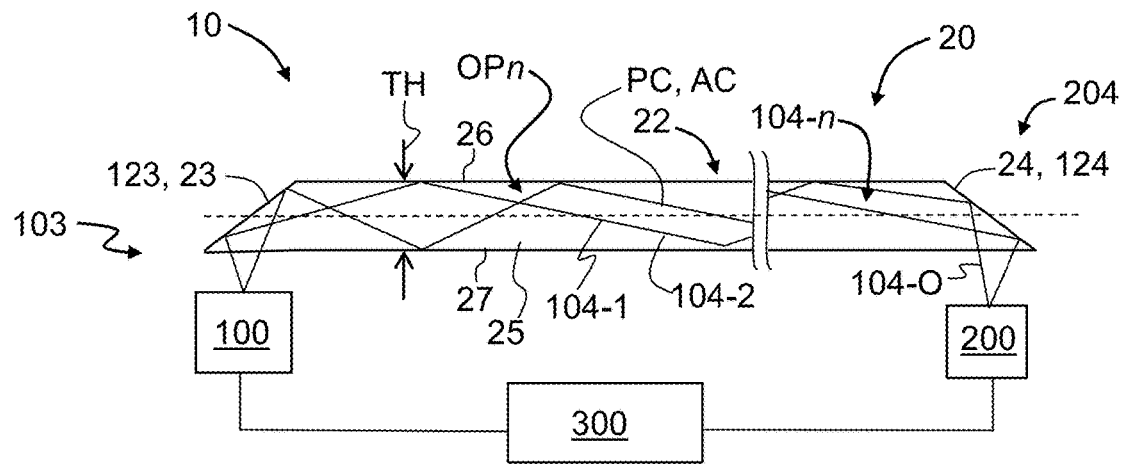

FIG. 4D is another example embodiment of assembly 20 similar to that of FIG. 4C but wherein input and output edges 23 and 24 are angled to define TIR surfaces that serve to internally reflect light 104. Light 104 from light source 100 enters waveguide 22 at lower surface 27 over a range of angles, and is internally reflected at angled edge 23. The internal reflection directs light 104 to be guided over optical paths OPn. At the detector side, light 104 traveling as light rays 104-$n$ reflects from angled edge 24 and is directed to exit waveguide 22 at lower surface 27, where the output light 104-O is detected at detector 200. Angled edge 23 thus defines a component of input optical system 123 and angled edge 24 defines a component of output optical system 124. As discussed above, an aperture can be used adjacent detector 200 to make the detection process aperture limited and thus directed to a local intensity measurement.

Touch Screen Operation

Figure 5A:
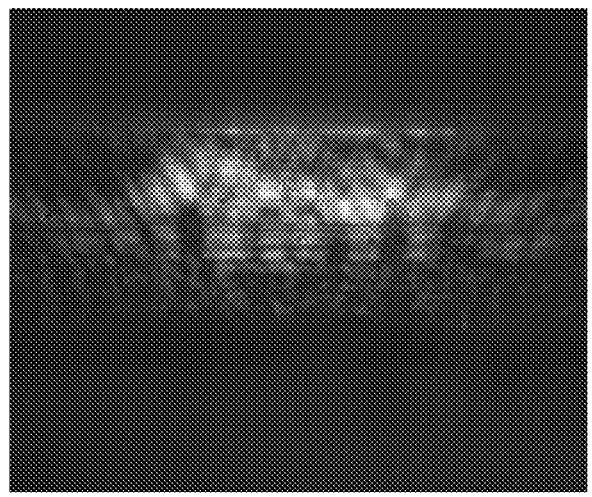
FIGS. 5A through 5C are near-field images of the output light at the output edge of the waveguide for different amounts of bending of the waveguide, with FIG. 5A illustrating the case of no bending.

In the general operation of system 10, wherein there is no touch event TE occurring on upper surface 26 of waveguide 22, optical paths OPn associated with the different guide modes remain constant so that the output light 104-O exiting the waveguide at the detector end remains constant in time. FIG. 5A is a photograph of a near-field interference pattern from output light 104-O at output edge 24 of waveguide 22 when there is no touch event TE occurring.

Figure 5B:
Figure 5C:
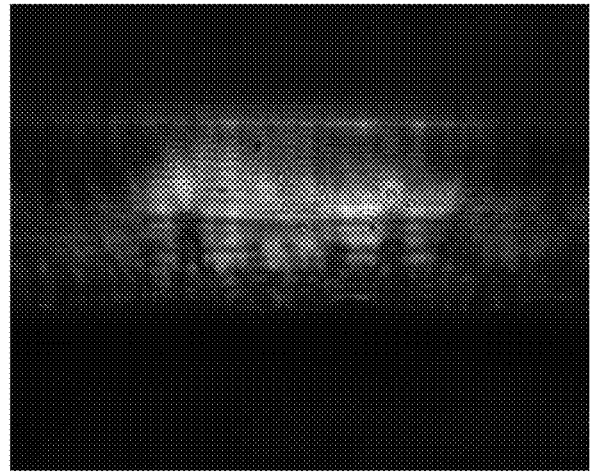

FIG. 5B is a photograph of the near-field interference pattern from output light 104-O for the system 10 associated with FIG. 5A, but with a touch event TE applied with a moderate amount of pressure. It can be seen that the light distribution of the near-field interference pattern has changed from the no-touch-event condition of FIG. 5A. FIG. 5C is a photograph of the near-field interference pattern from output light 104-O for the system 10 associated with FIGS. 5A and 5B, but with a touch event TE applied with a strong pressure. It can be seen that the light distribution of the near-field interference pattern has changed from the moderate-pressure touch-event condition of FIG. 5B.

The change in the light distribution in output light 104-O arises because pressure from the touch event TE causes waveguide 22 to bend, which causes a change in the relative optical path differences for the light rays 104-$n$. Said differently the waveguide bending affects each optical path OPn differently, so that changes in the existing optical path differences arise and give rise to a changed set of optical paths OP'n. The output light 104-O thus defines a multimode interference pattern, and this pattern changes when the differences between the optical paths OPn changes.

Figure 6A:
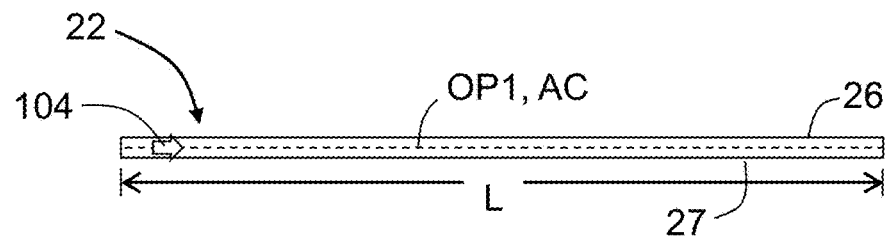
FIGS. 6A and 6B are schematic side views of the waveguide that illustrate how bending the waveguide causes the light traveling in the waveguide to traverse a longer optical path.

FIG. 6A is a cross-sectional view of waveguide 22 with light 104 traveling over a first optical path OP1 that the lowest-order mode, i.e., travels straight through the waveguide along central axis AC. In fact, the first optical path OP1 and central axis AC are the same in this case.

Figure 6B:
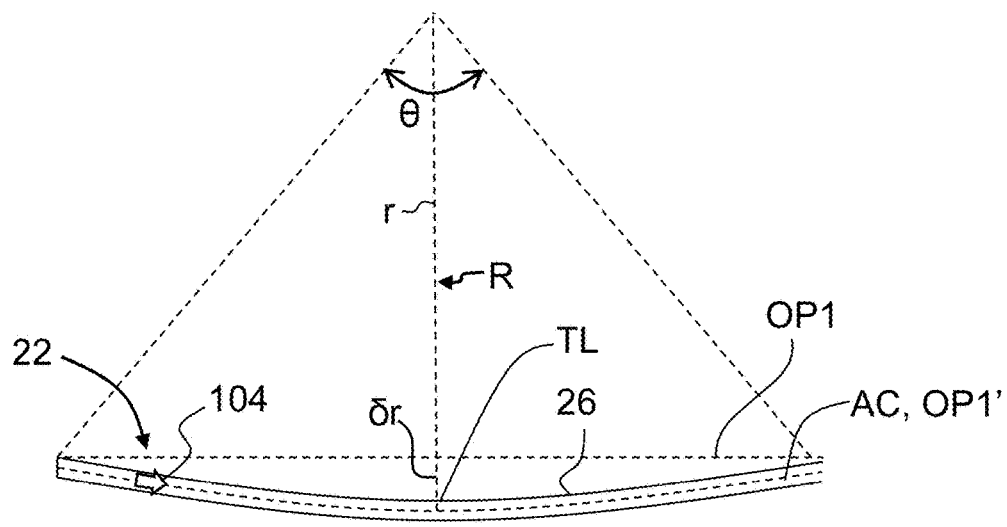

FIG. 6B is the same waveguide 22 as in FIG. 6A but where upper surface 26 is subject to a touch event TE at a touch event location TL in the middle and that bends the waveguide. It is assumed that waveguide 22 has a length L when no touch event TE is occurring. When a touch event TE occurs at touch location TL, waveguide 22 bends with a radius of curvature R measured relative to central axis AC.

The new optical path OP1' associated with the flexed waveguide of FIG. 6B is longer than the optical path OP1 of the unflexed top waveguide of FIG. 6A. Assuming that the curvature of waveguide has a radius of curvature $R=r+\delta r$, and that curvature subtends an angle $\theta$, then if $\theta$ is a relatively small angle (i.e., R is relatively large, which is a reasonable assumption in the present instance), it can be readily shown that the change in the optical path from OPA to OPA' is approximately $\delta r$.

Thus, the optical path difference between the optical paths OP1 and OP1' due to bending of waveguide 22 due to a touch event is about $\delta r$. If $\delta r$ is for example about 2.5 microns, that would be roughly equal to two wavelengths of infrared light of wavelength of 800 microns or so. This amount of optical path difference would manifest itself as a change in the output light 104-O, e.g., a change in the amount of optical power at a given point at output edge 24 due to shifting fringes in the detected portion of the resulting interference pattern. This is what is shown in FIGS. 5A through 5C. The changes in the optical paths other than the lowest-order optical path change in a similar manner.

Modal decomposition and the attendant multimode interference is one way to describe the way that light 104 gets re-distributed in waveguide 20. In this description, output light 104-O can be thought of as having changing pattern due to changing interference effects. However, another way to represent the redistribution of light 104 is to use a geometrical model based on ray tracing. Indeed, with a waveguide thickness TH in the order of 1 mm, diffraction effects can be neglected. So in other embodiments, different components (rays) of output light 104-O are re-directed by the deflection of waveguide 20, and the re-direction changes the character of the output light, e.g., the intensity pattern, the location of the intensity centroid, the division of a generally single output beam into multiple output beams, etc.

When injecting substantially collimated light 104 into a planar waveguide 20 such as a transparent glass sheet (see, e.g., FIG. 6C), the light travels thereth rough without being reflected. The resulting energy distribution as defined by output light 104-O at the output edge 24 of waveguide 20 has a substantially homogeneous distribution. When some bending is introduced (see FIG. 6D), a portion of light 104 is reflected off of the upper and lower surfaces 26 and 27. This modifies the energy distribution of output light 104-O.

Figure 6C:
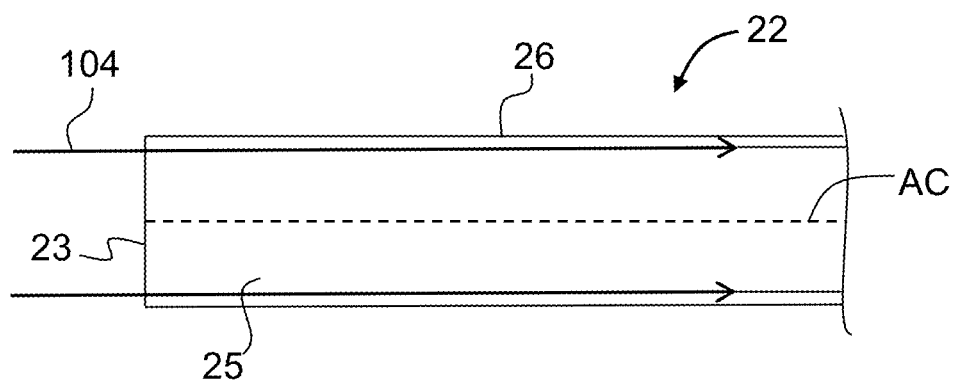
FIGS. 6C and 6D are close-up view of the input edge portion of the waveguide showing how otherwise collimated light traveling with no bounces (FIG. 6A) in an unbent waveguide can travel with bounces (FIG. 6B) in a bent waveguide.
Figure 6D:
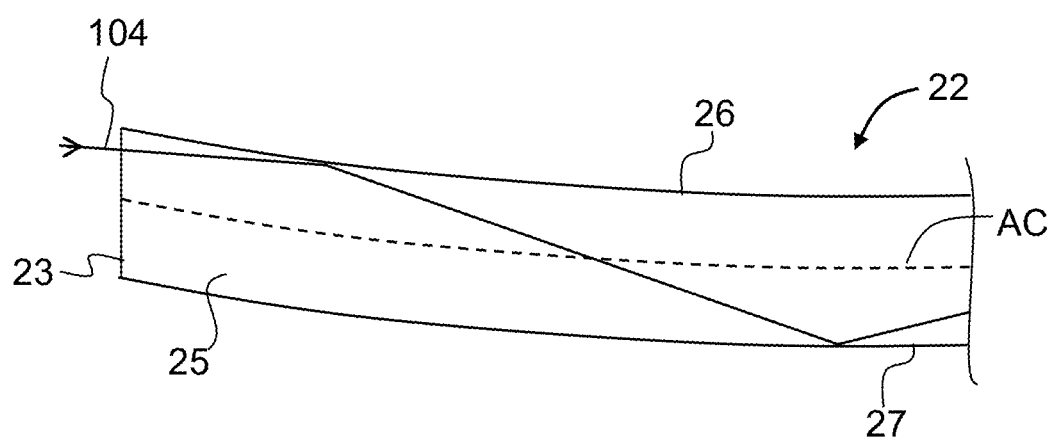
Figure 6E:
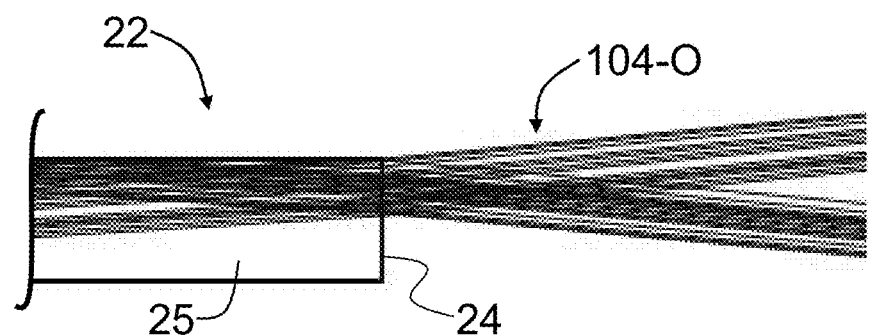
FIG. 6E is a close-up view of the output edge portion of the waveguide showing how output light from a bent waveguide exits the output edge and has a non-uniform (inhomogeneous) distribution.
Figure 6F:
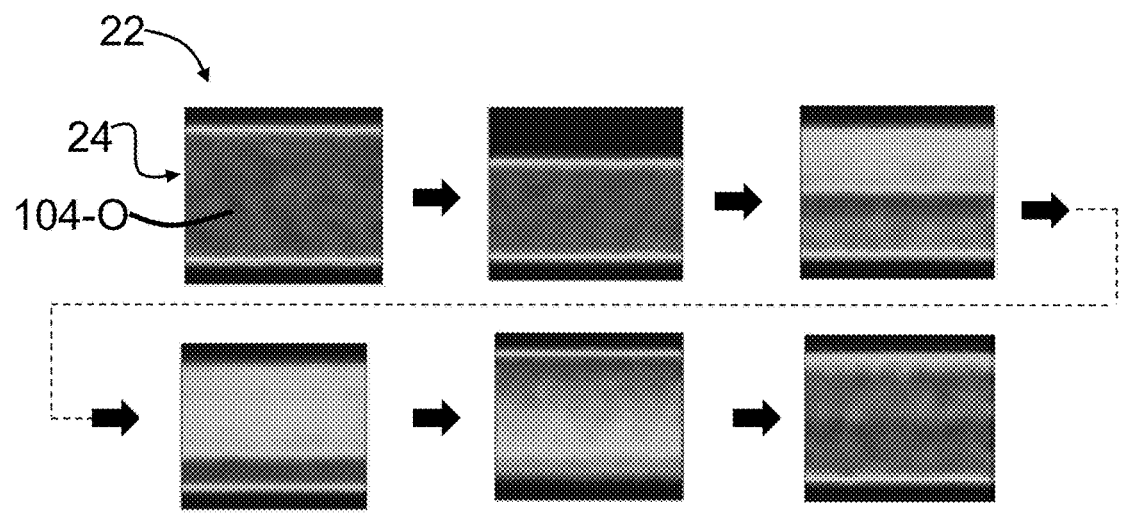
FIG. 6F show the intensity distribution of the output light at the output edge of the waveguide and illustrates the changes that occur in the intensity distribution of the output light as the amount of waveguide flexing (bending) increases.

FIG. 6F shows example images output light 104-O as determined using a ray tracing model for different amounts of waveguide bending. The energy distribution starts out substantially homogeneous for waveguide 20 without any bending (top left image). The energy distribution then becomes assymetric and ends up substantially homogeneous again when the amount of bending is close to half of the waveguide thickness. By putting an aperture 124 at the output, one can expect obtain a quasi-sinusoidal detector signal SD as a function of the waveguide bending amplitude.

Figure 14:
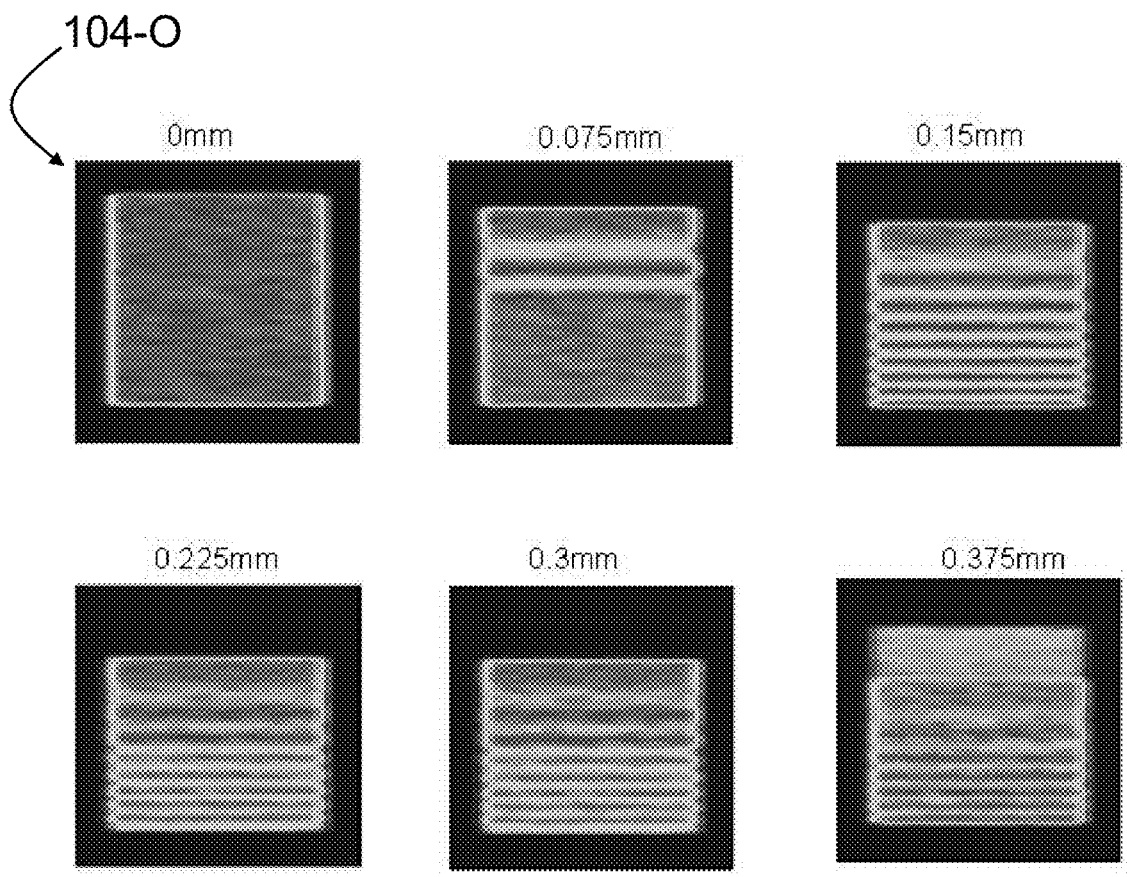
FIG. 14 shows a series of simulated images of output light beams obtained by summing electric fields of the output light rather than the intensity.

The results shown in FIG. 6F does not include any interference effects since all the rays that propagate are added in intensity. FIG. 14 shows images akin to those of FIG. 6F but that are the result of the same model, except that rays are added in electric field. As can be seen, higher-frequency fringes appear due to interference effects between the two beams exiting output edge 24 of waveguide 20 at two different angles.

System 10 can be operated in two different modes. In the first mode, the nearly collimated light 104 is injected at some angle with respect to waveguide 20, resulting in creating the very high-frequency fringes, which are visible in FIGS. 6G and 5B. By choosing aperture 214 to be significantly larger than the period of those fringes, the detection process becomes insensitive to the fringes and is only sensitive to the motion of the envelope predicted by FIG. 6F. In the second mode, light 104 is injected nearly parallel to waveguide 20 and aperture 214 is significantly smaller than the fringe period. In this case, the detection process is sensitive to the motion of the fringes, which can improve the detection sensitivity FIGS. 6C and 6D are close-up views of the input edge portion of waveguide 22 of FIG. 6B. FIG. 6C shows parallel (collimated) input light 104 traveling in the lowest-order mode straight down the waveguide without any bounces when there is no flexing of the waveguide. FIG. 6D shows a flexed (bent) waveguide where the inputted collimated light 104 ends up bouncing off of the upper and lower surfaces. This means that the optical path of light 104 in the bent waveguide is even longer than if it traveled straight down the curved central axis AC. So the bending or flexing of waveguide 22 can turn collimated (lowest-order-mode) light into higher-order-mode light. This results in a greater amount of optical path change, which translates into a greater amount of change in the distribution of output light 104-O at output edge 24.

FIG. 6E is a close-up, cross-sectional view of the output edge portion of waveguide 22, showing light rays 104-n based on the results of ray tracing modeling when the waveguide is flexed, as shown in FIG. 6C. Light rays 104-n are inhomogeneously distributed due to the flexed waveguide 22. FIG. 6F show the intensity distribution of output light 104-O at output edge 24, and illustrates the change in the intensity distribution as the amount of flexing (bending) increases.

Figure 6G:
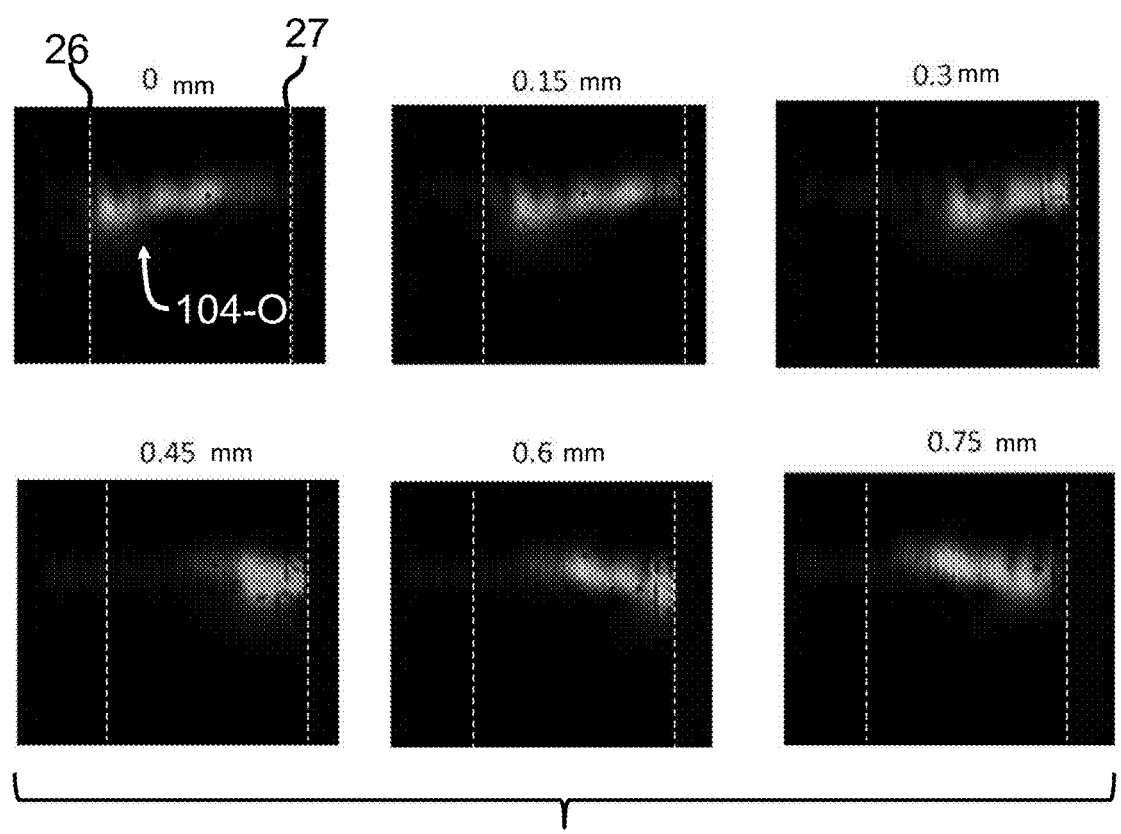
FIG. 6G shows a sequence of images of output light 104-O taken at the output edge of an example waveguide, with the images showing the changes in the intensity distribution as well as a shift in the intensity pattern with increased waveguide bending.

FIG. 6G shows a sequence of images of output light 104-O at output edge 24 of waveguide 22. The waveguide 22 was a sheet of glass having a thickness TH=1.3 mm thickness. The thickness TH is indicated in each of the images. The approximate locations of the upper and lower surfaces are indicated by white dotted lines. The light distribution in output light 104-O light starts moving to the right, reaches a point where most of the light is concentrated at the edge of the sheet and then comes back to the center. If we keep bending, light keeps moving right-left and left-right a periodic way. The bending that is needed to make the light moving from being centered on the sheet to be centered again is nearly equal to half the thickness of the sheet which is in good agreement with the model.

Figure 7A:
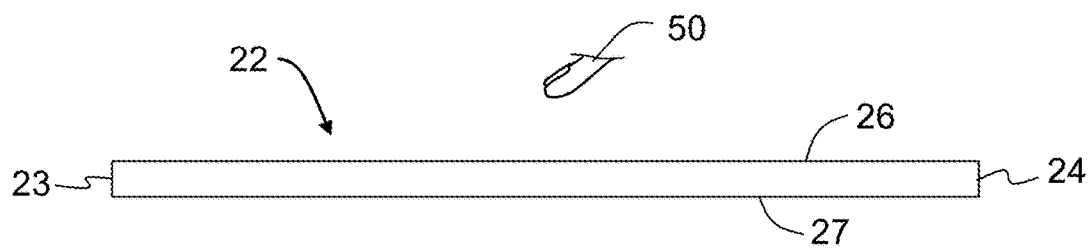
FIG. 7A is a schematic cross-sectional diagram of an example waveguide with a finger poised to create a touch event TE a central touch location.
Figure 7B:
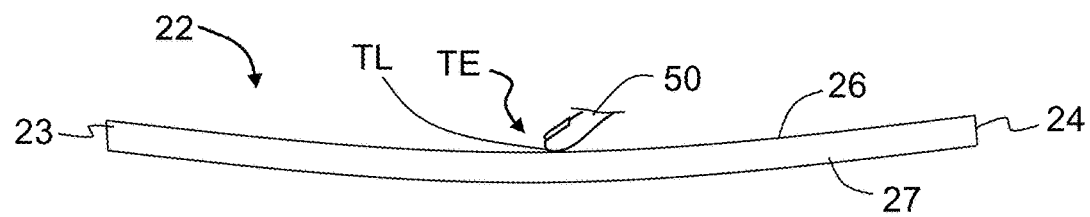
FIG. 7B shows waveguide of FIG. 7A with the touch event caused by the finger exerting downward pressure on waveguide on the upper surface, thereby causing the waveguide to flex.
Figure 7C:
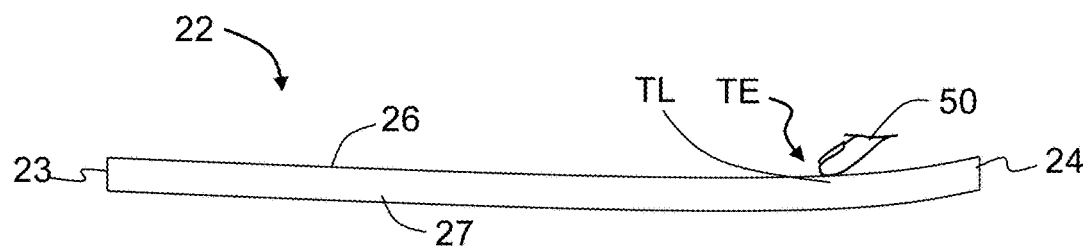
FIG. 7C is similar to FIG. 7B, except that the touch event occurs at a touch location that is closer to output edge.

FIG. 7A is a schematic cross-sectional diagram of waveguide 22 with a finger 50 poised to create a touch event TE a central touch location. FIG. 7B shows the touch event caused by finger 50 exerting downward pressure on waveguide 22 on upper surface 26, thereby causing waveguide 22 to flex. FIG. 7C is similar to FIG. 7B, except that the touch event TE occurs at a touch location TL that is closer to output edge 24, i.e., the touch location is off-center of waveguide 22.

Determining the Time Evolution of Touch Event

Aspects of the disclosure include determining the time evolution of the touch event TE. This can be used for example to determine a relative amount of pressure that is applied to upper surface 26 of waveguide 22 by, for example, a finger, a stylus, the eraser-end of a pencil, or like implement. It is noted here that the pressure applied to assembly 30 at top waveguide 22A may be through another surface that resides upper surface 26A, such as a coating layer.

Thus, in an example embodiment, the time evolution of the processed detector signal SD is used to characterize the time evolution of touch event TE. For example, as an object (e.g., finger 50, stylus, etc.) initially contacts surface 26 of waveguide 22, a small amount of flexing of the transparent sheet occurs. As finger 50 continues to push into top waveguide 22, the amount of flexing of the top waveguide changes, so that optical path lengths OPn continuously changes. The changing optical paths show up as a continuous change in the output light 104-O and thus the processed detector signal SD. The continuous change in the optical paths changes the angular and spatial distribution at the output light 104-O. This includes interference patterns due to changes in optical paths and the polarization state of light 104 due to the light passing difference regions of fabrication-induced and stress induced birefringence.

Once the object applies a constant pressure at touch location TL, the processed detector signal SD stops changing. At this point, the amount of time that the processed detector signal SD remains constant can be measured. This information can be used, for example, to carry out a function by requiring the touch event TE to have associated therewith not only a certain amount of pressure but a select duration as well. Further in the example embodiment, it can be required that the touch event have a select time evolution in pressure that is consistent with say a finger or stylus used to intentionally cause a touch event, as opposed to say an arbitrary object pressing down on upper surface 26 of waveguide 22 and inadvertently triggering a touch event.

Figure 8:
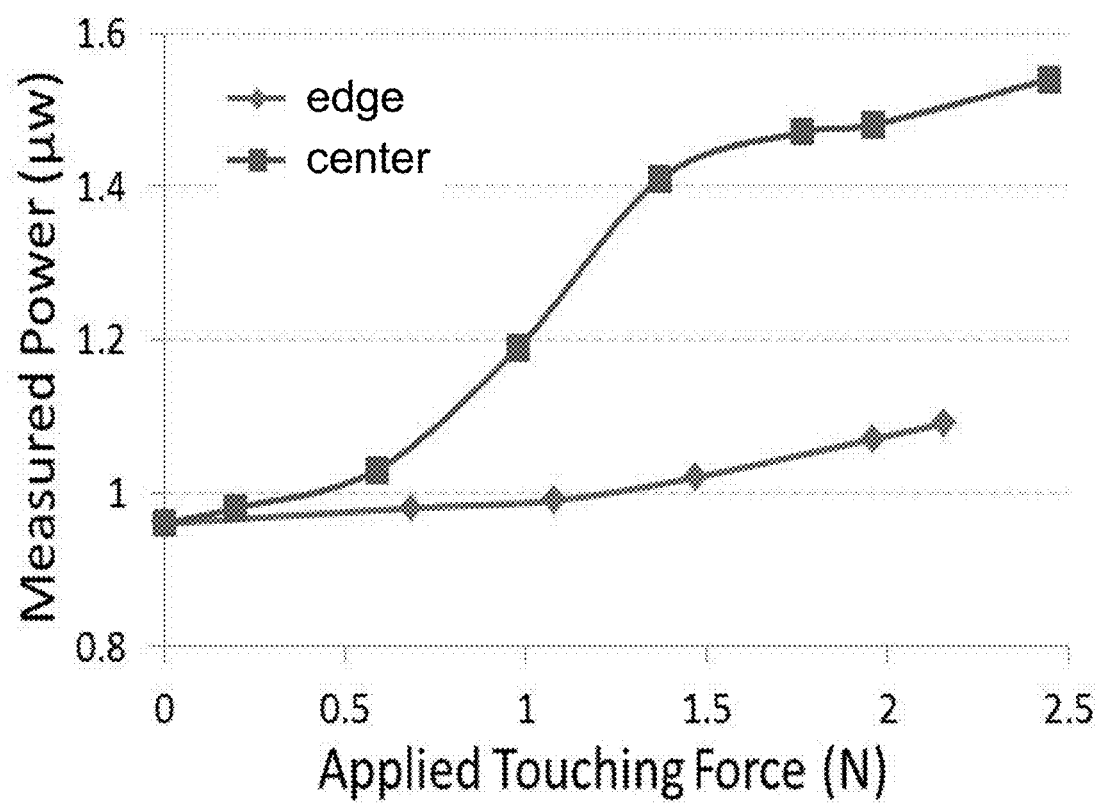
FIG. 8 is a plot of the measured power $P_M$ (in microwatts, μW) of the output light at a given output edge location versus the applied touching force $F_T$ (in Newtons, N) for a center location (squares) and an edge location (diamonds), illustrating how the change in power is less for an edge location than for a center location.

FIG. 8 is a plot of the measured optical power $P_M$ in microwatts (μW) versus the applied touching force $F_T$ in Newtons (N) for an example system 10 having multiple light sources 100 and multiple detectors 200. The plot includes data from a touch event TE that has a touch location at the center of waveguide 22, as indicated by squares in the plot and as shown in FIG. 7B. The plot also includes data from a touch event near the edge as indicated by diamonds in the plot and as shown in FIG. 7C.

The plot indicates that a touch event TE near the edge of waveguide 22 do not give rise to as large a change in the measured power at detector 200 as does a touch event near the center. This data can be used to establish the general location of a touch event, i.e., whether it is closer to the center than to the edge of the waveguide.

To demonstrate the touch sensitivity of system 10, an example optical-fiber-based system as shown in FIG. 4A was employed. Light source 100 was in the form of a laser having an operating wavelength of 6328 nm. Laser 100 was pigtailed to a single-mode fiber 123. A collimating lens was used launched into a 4"×4" Gorilla® glass substrate as waveguide 22. A multimode fiber 124 was butt-coupled to the glass substrate at output edge 24 to collect a portion of output light 104-O and relay it to detector 200.

When waveguide 22 is subjected to pressure (force) at a touch location TL, the detected light intensity changes. FIGS. 5A through 5C, introduced and discussed above, shows the near field image of bright and dark interference pattern taken at the edge of the glass by a detector 200 in the form of a CCD camera. Significant pattern changes can be seen, with the center interference intensity maximum shifted from the being near the upper surface 26 to being near the lower surface 37.

With the variation of the intensity pattern of output light 104-O, the change in detected power can be used to indicate the magnitude of the applied force associated with the touch event.

Near-field and Far-field Detection

One example embodiment of system 10 detects output light in the "near field," i.e., close to output edge 24, while in another example embodiment the system detects the output light in the "far field," i.e., away from output edge 24.

Near-field detection can be accomplished by placing a small aperture 214 (i.e., smaller than the thickness TH of waveguide 22) in front of detector 200. In this configuration, ray-trace modeling of system 10 indicates that the detected signal SD is a periodic function as the waveguide is flexed, with the period being close to the thickness TH of waveguide 22.

Far-field detection can be accomplished by injecting substantially collimated light 104 into input edge 23 of waveguide 22 and observing in the far field the output light 104-O, which is expected to be concentrated about two directions. The two directions correspond to light 104 undergoing an even number and an odd number of reflections, respectively. Changing the amount of bending in waveguide 22 changes the distribution of optical power in the two directions. The two directions translate into two locations, depending on the distance at which output light 104-O is detected.

Figure 9A:
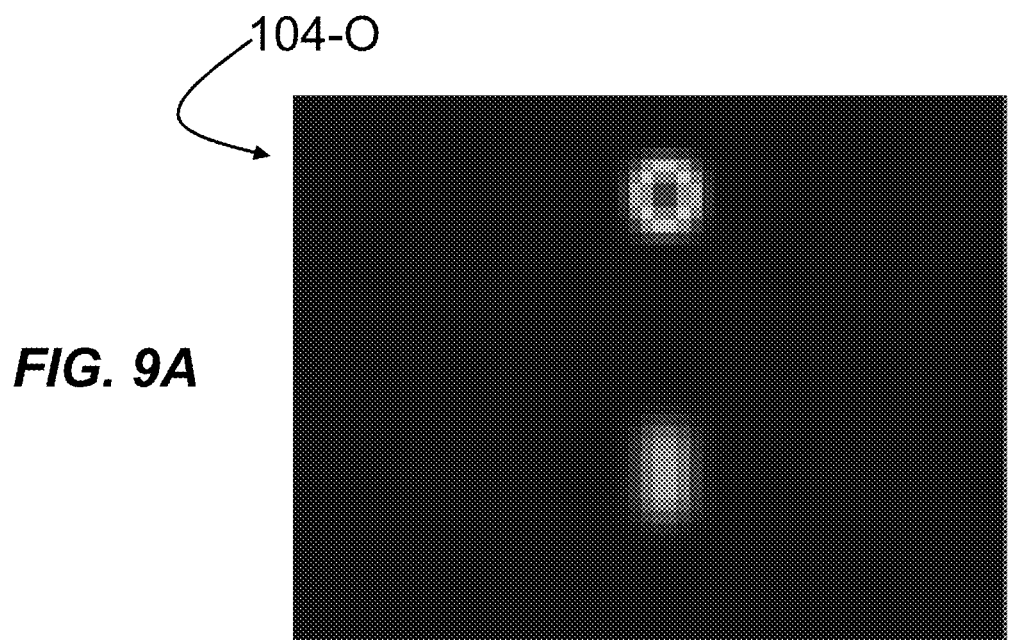
FIG. 9A and FIG. 9B are simulated and measured far-field images of the output light emitted at the output edge of an example flexed waveguide two directions (positions) of the output light.
Figure 9B:
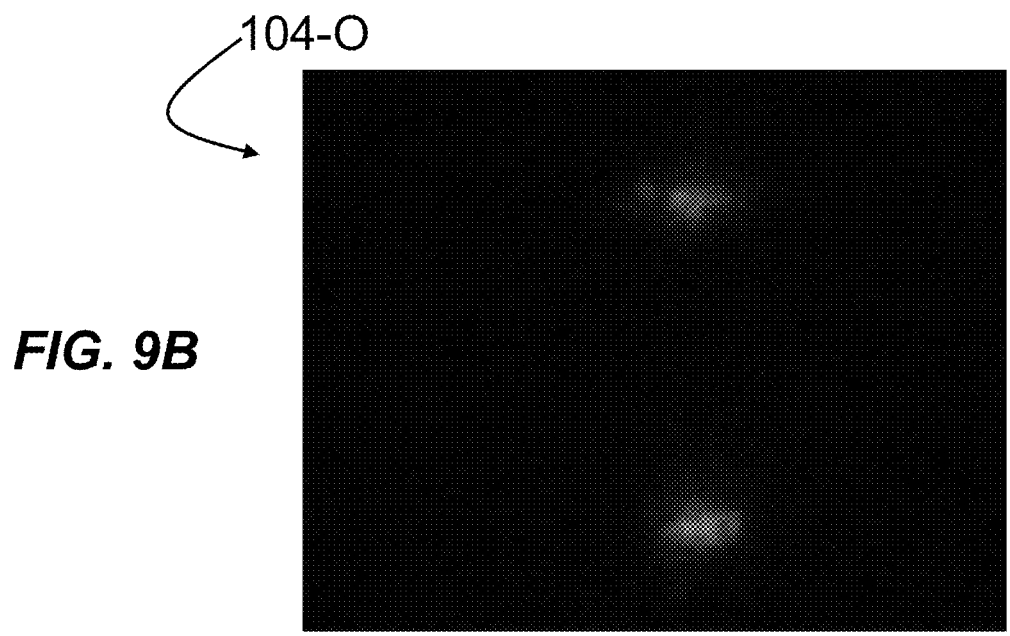
Figure 9C:
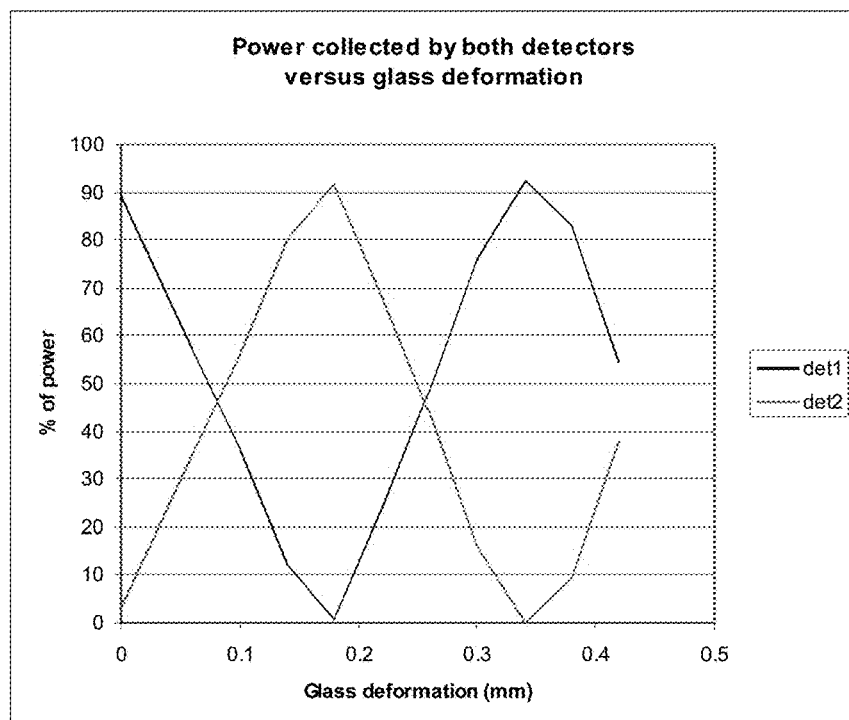
FIG. 9C is a plot of the % of Power vs. glass deformation (mm) for the two light directions (positions) as determined by photodetectors arranged at the locations of the light spots.

FIG. 9A is a simulation of output light 104-O as measured in the far-field for a flexed waveguide, showing the two directions (positions) of the output light. FIG. 9B shows the measurement results for an actual flexed waveguide 22, with the far-field distribution of intensity of output light 104-O closely resembling the modeled results of FIG. 9A. FIG. 9C is a plot of the % of Power P vs. glass deformation D (mm) for the two light directions as determined by first and second photodetectors (curves A and B in the plot) arranged at the locations of the light spots. As can be seem from the plot, the amount of power in the spots is periodic, with the two periods being out of phase by 180 degrees.

Figure 10:
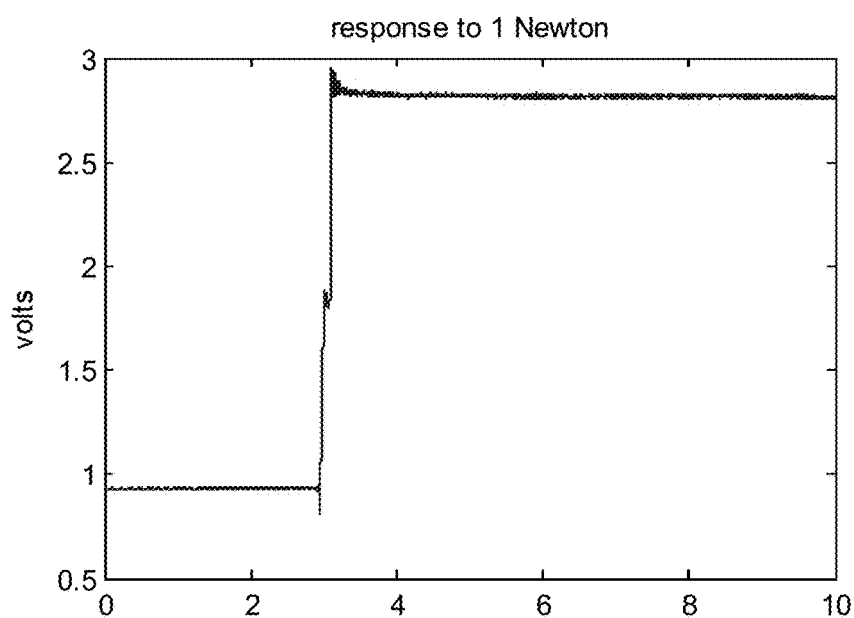
FIG. 10 is plot of the voltage versus time for one of the two far-field light spots when applying an instantaneous force of 1 Newton to an example waveguide made of glass having a thickness TH of 1.2 mm, wherein the voltage represents the measured power.

FIG. 10 is plot of voltage V versus time in one of the two far-field light spots when applying an instantaneous force of 1 Newton to an example waveguide 22 made of glass having a thickness TH of 1.2 mm. The voltage represents the detected optical power. The plot indicates a steep transition, which means that the detection of the touch event can be based on the transfer of optical power between the different directions of the far-field output light 104-O.

System 10 can also be configured for detecting output light 104-O at one or both of upper and lower surfaces 26 and 27. Since bending waveguide 22 changes the way light 104 bounces from the upper and lower surfaces 26 and 27, this change can be used to measure waveguide bending if the light can be accessed and detected.

Ray Trace Simulations

Figure 11A:
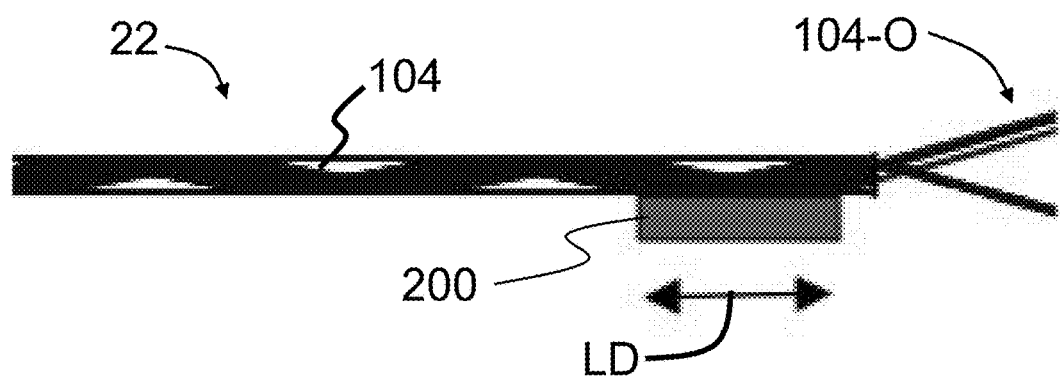
FIGS. 11A and 11B are close-up, cross-sectional views of the output edge portion of an example waveguide showing simulate ray traces for different amounts of waveguide bending, and illustrating embodiments where the detectors are arranged on the lower surface (FIG. 11B) and both the upper and lower surfaces (FIG. 11B)
Figure 11B:
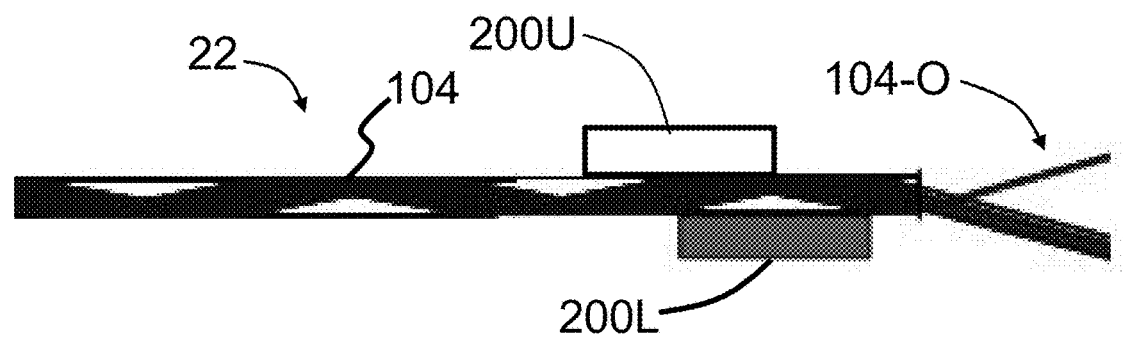

FIGS. 11A and 11B depict ray trace simulations based on injecting light 104 into a waveguide 22 having a thickness TH of 1.2 mm. The light 104 is injected at an angle of 10 degrees so that the light bounces off of upper and lower surfaces 26 and 27. FIG. 11A shows no waveguide bending while FIG. 11B shows a bending of 0.3 mm. Detector 200 is shown disposed adjacent upper surface 26 of waveguide 22. The detector signal SD changes as the degree of bending of waveguide 22 changes since the location of the light bounces (and in some cases, the number of bounces) changes. According to the model, the detector signal SD is periodic with a period equal to half the waveguide thickness TH.

An example detector 200 has a length LD in the direction of central axis AC defined by $LD=TH/(\sin \theta)$, where TH is the aforementioned waveguide thickness and $\theta$ is the angle of light 104 with respect to upper and lower surfaces 26 and 27 of waveguide 22.

Figure 12A:
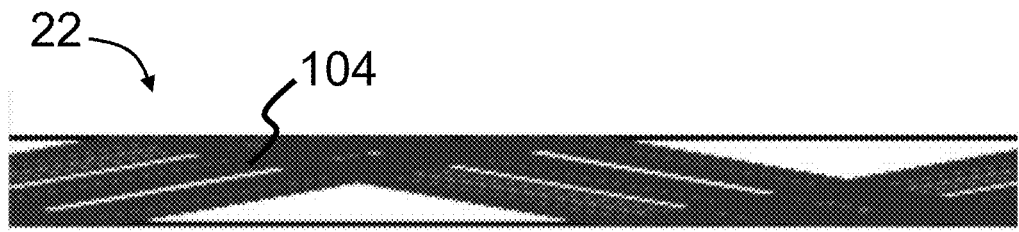
FIGS. 12A through 12C are schematic diagrams of an example waveguide showing simulated light rays for examples where the input light partially fills the waveguide (FIG. 12A), mostly fills the waveguide (FIG. 12B) and substantially completely fills the waveguide (FIG. 12C)
Figure 12B:
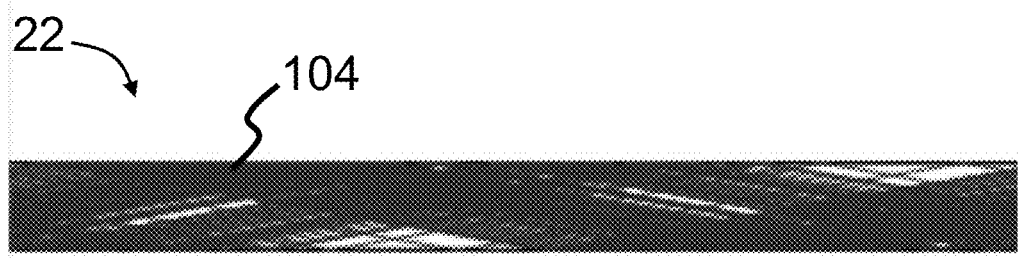
Figure 12C:

FIGS. 12A through 12C show ray-trace simulations of light 104 traveling in a waveguide 22 having a thickness TH of 1.2 mm and having an axial length of 240 mm. Input edge 23 was illuminated with homogeneous illumination having divergence (full) angles of 0 degrees (FIG. 12A), 0.3 degrees (FIG. 12B) and 0.6 degrees (FIG. 12C). As can be seen, at 0.6 degrees, the entire waveguide is filled with light 104 so that the signal modulation induced by waveguide bending disappears. The maximum beam divergence $\delta$ when the input beam 104 overfills waveguide thickness TH is approximately given by $\delta<2\cdot TH/L$, where L is the propagation length.

According to this model, the expectation is that the signal will be periodic (independent of the detection scheme). So, as long the system is operated close to the zero of the periodic function, the signal will be substantially linear. However, the phase of the response function depends on many parameters such as the glass length, the glass thickness, the angle of injection, and the like. In an example embodiment, active alignment can be used to ensure that system 10 operates close to the zero of the periodic function.

Two-detector Embodiment

Figure 13:
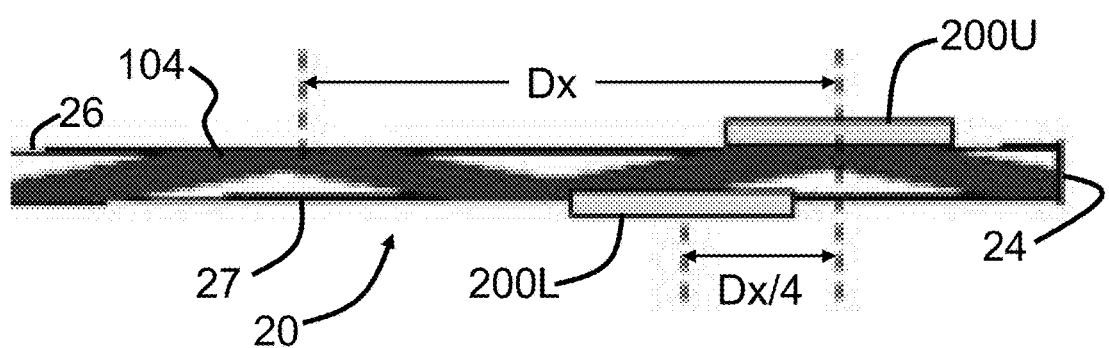
FIG. 13 is similar to FIG. 11B and illustrates an example detector configuration where the two detectors are arranged so that the detector signals are out of phase.

FIG. 13 illustrates an example embodiment of system 10 that employs two detectors 200 (200U, 200L) disposed adjacent upper and lower surfaces 26 and 27. Detectors 200U and 200L are arranged so that they detect signals SD that are out of phase by a quarter of period. In that case, we end up with a cosine and a sine function which allows one to back calculate the pressure.

In FIG. 13, the distance Dx denotes the period of the bouncing, by locating two detectors shifted by Dx/4+n Dx (n integer), the expectation is that the signal modulation versus the applied force will be out of phase by one quarter of the signal period.

In an example embodiment such as illustrated in FIG. 13, two or more detectors 200 can be employed on one or both of upper and lower surfaces 26 and 27. In an example, three detectors 200 are used. Two of the three detectors 200 can be disposed on upper and lower surfaces 26 and 27 adjacent output edge 26 while the third can be arranged at or near the middle of waveguide 22 on either the upper or lower surface. Simulations indicate that such a configuration allows for the detection of three periodic detector signals SD that are out of phase, and with the relative phases changing as a function of the amount of bending in waveguide 22.

Fringe Detection

In one aspect of the operation of system 10, light rays 104-n are launched into waveguide 22 and the output irradiance profile is measured based on output light 104-O, which can be outputted from one or more of output end 24 and upper and lower surfaces 26 and 27. As a consequence, interference effects are not fully taken into account. In the case where collimated beams 104 are propagating at two different angles, they can interfere and create high-frequency fringes. These fringes are visible when using a high magnification to image the output beam on a CCD camera.

In practice, output light 104-O can define fringes having relatively high frequencies. In the case where an aperture-limited detection scheme is used, the aperture 214 use to filter the output light 104-O is generally much larger than the fringe period. In this case, the detection is only sensitive to the motion of the envelope of the output light beam.

If the input light beam 104 can be aligned precisely with central axis AC of waveguide 22, low frequency fringes will arise, and the pinhole will filter the fringes. So, on top of detecting the motion of the beam envelope, the system will also start detecting the lower-frequency fringes.

FIG. 14 shows a series of simulated images of output light beams 104-O obtained by summing electric fields of the light rather than the intensity. In the simulation, the waveguide thickness was TH=1.2 mm and the input beam 104 was collimated and normally incident the input end 23, with the illumination overfilling the input end. The degree of bending is shown above each image.

As can be seen, when waveguide 20 starts bending, fringes appear in the pattern and generally add to the general motion of the envelope. Assuming that the near-field filtering element is smaller than the period of the fringes, the high frequency modulation can be detected making this measurement regime much more sensitive than when just detecting the motion of the beam envelope.

Waveguide with Cladding Layers

Figure 15:
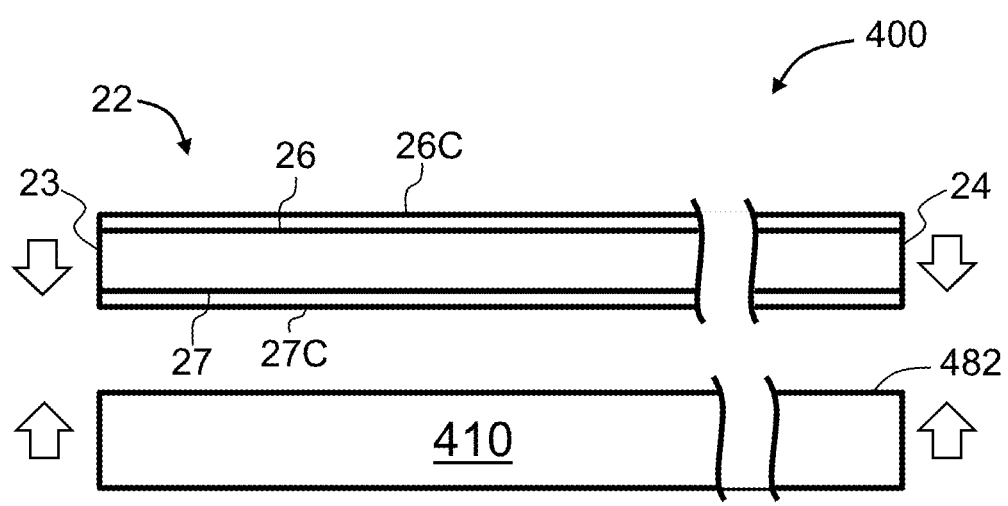
FIG. 15 is a schematic partially exploded side view of an example waveguide that includes upper and lower cladding layers that enhance the waveguiding ability, and also showing a display unit that interfaces with the lower surface of the cladded waveguide.

In an embodiment of system 10, light 104 is injected close to the direction of the waveguide (i.e., substantially collimated), so that the light is very well guided. FIG. 15 illustrates an example embodiment of system 10 that includes at least one of upper and a lower cladding layers 26C and 27C, respectively. Cladding layers 26C and 27C have a refractive index slightly lower than the index of waveguide 22, thereby serving to enhance the waveguiding properties of the waveguide. This allows for an adhesive layer (e.g., epoxy bond) to be applied to one or both of the cladding layers, or to add an anti-glare layer or other such performance-enhancing layer or layers on the upper or lower sides of waveguide 22 without disturbing the propagation of light 104 therein.

Polarization Effects

The touch system 10 can be improved by the additional use of polarization optics configured to a detect polarization effects, such as a change in the polarization state of output beam 104-O. This is made possible by changes in the birefringence in waveguide body 25 and thus along the optical path of light 104 as it traverses the waveguide.

Birefringence is the optical property of a material wherein the material refractive index depends on the polarization and propagation direction of light. Birefringence is also known as photoelasticity. Certain birefringent optical materials such as glass are optically anisotropic due to mechanical stress, while many crystals are birefringent due to their crystal structure. In the case of single-axis mechanical stress, the value of birefringence is the difference of the refractive index for light oscillating in the parallel direction of the stress and that oscillating in the perpendicular direction.

The difference in the optical path between light oscillating in two orthogonal directions is known as the retardation (Ret) of the beam. If a beam is linearly polarized and aligned so that the oscillation is in the direction of the stress, or perpendicular to the stress, then no retardation is detected since only one index is observed. The amount of retardation is proportional to the mechanical stress and the stress optical coefficients (K). The stress optical coefficient varies with glass types, and varies much less with temperature and wavelength.

The amount of retardation Ret can be calculated by the relation:

$$Ret = \frac{(m_\| - m_\perp)d}{\lambda} = \frac{Kd\sigma}{\lambda}$$

where Ret is the retardance in waves, n is the refractive index relative to the stress direction, d is the optical path length, $\lambda$ is wavelength, $\sigma$ is the mechanical stress (which is positive for tensile stress and negative for compressive stress), and K is the optical stress coefficient. The units of $\sigma$ is $N/mm^2$, or MPa (mega-Pascals). The units of K are $mm^2/N$. The common glass type BK7 has a K of $\sim 2.8 \times 10^{-6}$, and the table below is an example of the calculation of retardance due to stress birefringence over path lengths (distance) and pressures for a near infrared (IR) wavelength.

Figure 16:
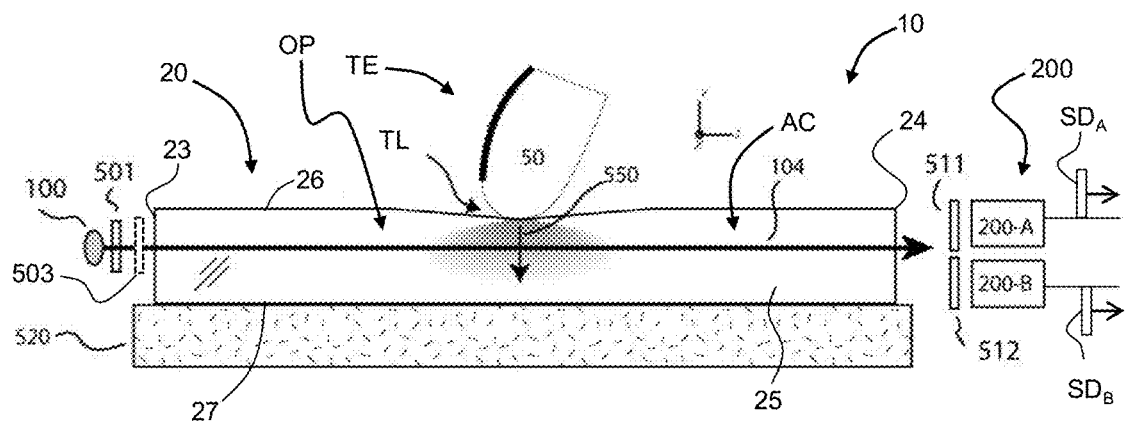
FIG. 16 is a schematic diagram of an example embodiment of touch system 10 that relies on polarization effects for touch sensing.

A simple implementation of polarization detection is shown in FIG. 16. Finger 50 is shown giving rise to a touch event that create pressure 550 in waveguide body 25 at and around touch location TL. A first polarizer 501 is disposed between light source 100 and input edge 24. Polarizer 501 is configured to linearly polarize light 104 in a direction 45° to the prominent direction of pressure 550, which is perpendicular to upper surface 22 of waveguide 20. In an example, light 104 is substantially collimated to travel parallel to central axis AC.

System 10 also includes a second polarizer 511 (also called an "analyzer") disposed between output edge 24 and detector 200, e.g., immediately adjacent detector 200. Detector 200 can be considered in some embodiments to consist of two detectors, denoted 200-A and 200-B. In an example embodiment, second polarizer 511 is arranged in the same 45° at the first polarizer 501 so that in the absence of any polarization rotation of light 104, the detector signal is maximum. However, second polarizer 511 can have any polarization orientation.

When pressure 550 is applied to waveguide 20, the retardance Ret of light changes 104. This means that the transmission of the polarizer 511 changes and the detector signal $SD_A$ from detector 200-A changes.

If second (detector) polarizer 511 is oriented at +45° to the y-axis and is parallel to the first (source) polarizer 501, then the detector signal SD as normalized to the maximum signal prior the application of pressure 550 will be equal to 1.

If the aforementioned second detector 200-B is employed and includes its own detector polarizer 512 that is orientated at −45° to the y-axis and 90° to polarizer 511, then the detector signal $SD_B$ from detector 200B will be zero while no pressure 550 is being applied. This assumes that under no additional pressure from the mounting of the glass, and that the glass is birefringent free in fabrication, which will be discussed later.

Figure 17:
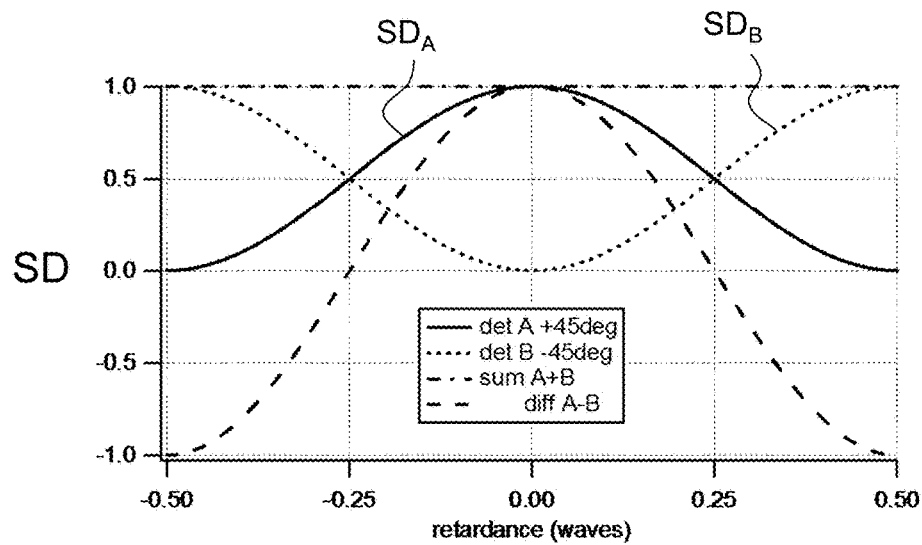
FIG. 17 is a plot of the detector signals SD from two detectors (det A, det B), illustrating how two detectors can be used to provide enhanced signal detection and measurement sensitivity.
Figures 18A, 18B, 18C, 18D, 18E:
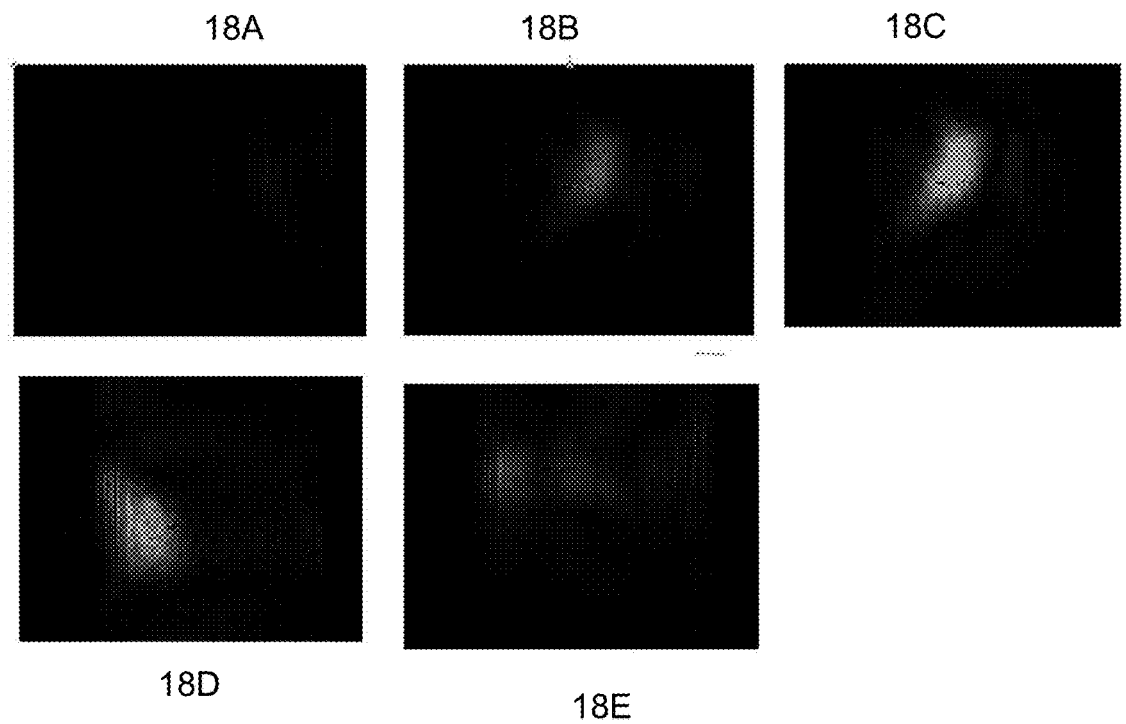
FIGS. 18A-18E are images of the output light as detected by the touch system of FIG. 16, showing how the amount of detected output light changes with increased bending of the waveguide due to the induced stress birefringence imparted to the waveguide at the touch location.

FIG. 17 plots the detector signals $SD_A$ and $SD_B$ of detectors 200-A ("det A) and 200-B ("det B") versus the induced stress retardance along the optical path due to compression by the pressure 550. The linearly polarized light 104 that enters input edge 23 becomes more elliptically polarized as the retardance along the optical path OP increases from zero, and becomes circular when the retardance reaches a quarter of a wave. At this point, the transmission of the two orthogonal polarizers 511 and 512 is the same.

When the pressure 550 increases to the point where it generates a half-wave retardance in waveguide body 25, then light 104 reverts to being linear polarized but rotated 90° relative to the source polarization. At this point, the transmission of polarizer 511 is zero, and the transmission of polarizer 12 is 1. The transmission of the two polarizers versus retardance is sinusoidal, with the two being perfectly out of phase.

An advantage of having two detectors 200-A and 200-B that detect orthogonal polarizations is that the summation and difference of the two detector signals $SD_A$ and $SD_B$ can be employed. One detector can determine the magnitude of the retardance Ret from the pressure, but the summation of the two detector signals provides the total intensity of the incident light on the detectors. This allows the information of the retardance change and the steering of the beam off of or onto the detectors to isolate the position (touch location TL) and the amount of pressure 550 associated with touch event TE. The difference of the detector signals $SD_A$ and SD$_B$ is more sensitive to changes in retardance and also assists in the isolation of beam steering and retardance components of the detector signal.

FIG. 18A-18E are images that show the measured results of energy profiles imaged through an analyzer (polarizer 511) as a glass waveguide 20 undergoes bending. As in FIG. 6G where there was no analyzer, the beam moves as the waveguide is bent. However, superimposed on this motion, the shape and power are also changing, which indicates that the polarization of light 104 is changing due to the birefringence along the optical path OP. This demonstrates the advantage of having two detectors 200-A and 200-B to track the signal changes of the beam steering and the birefringence. The first image 18A is with no pressure 550, with the subsequent images 18B-18E taken with increasing pressure. The image strength (which corresponds to the detector signal SD) is greatly reduced at the amount of pressure applied in FIG. 18E, indicating that around a half-wave of retardance was introduced by the stress birefringence.

In an example embodiment, system 10 optionally includes a quarter-wave waveplate 503 (shown in phantom) disposed between source polarizer 501 and input edge 23 of waveguide 20. If waveplate 503 is arranged with its fast axis oriented at 45° to the source polarizer axis, then circular polarized light 104 will be injected into waveguide 20. This allows for greater sensitivity to birefringence changes near zero retardance. The detector signals SD$_A$ and SD$_B$ associated with detectors 200-A and 200-B can be described by the plot of FIG. 17 if the horizontal axis is shifted by 0.25λ, so that zero retardance location is moved to where the detector signals SD$_A$ and SD$_B$ are equal. In this configuration, the difference of the two detector signals SD$_A$ and SD$_B$ is at the location of highest slope so that the ratio of the two detector signals provide even higher sensitivity. Near zero retardance, the slope of the ratio of the normalized detector signals for detectors 200-A and 200-B is 4π.

The difference between the two linear orthogonal polarizations is defined by one of the four Stokes parameters for characterizing the state of polarization. An example touch system 10 includes four detectors with quarter-wave plates (not shown) placed just downstream of detector polarizers 511 and 512, with their fast axes oriented 45° to the linear polarizers ("circular analyzers"). In this configuration, one of the detectors 200 detects right-handed circularly polarized light and the other detects left-handed circularly polarized light. The difference in the signals between the two detectors defines another one of the Stokes parameters.

These different polarizers and quarter-wave plates can be placed in front of the four sections of a quad-cell detector 200. Measuring two Stokes parameters provides not only information on the retardance of the beam 104, but also the mean rotation of the stress vectors along the optical path as projected in the plane perpendicular to the optical path. The additional information provided by the two added detectors can be used in isolating touch locations TL and the amounts of pressure 550 applied at the touch locations during a touch event TE.

An example embodiment of system 10 of FIG. 16 includes at least one support member 520 operably arranged and configured to support waveguide 20. An embodiment of a support member 520 covers the entire lower surface 24 of waveguide 20 and is relatively inflexible. Support member 520 serves to constrain the motion of waveguide 20 so that pressure 550 produces compressive stress at the touch location TL where the pressure is applied, as well as in a surrounding portion of waveguide body 25. Support member 520 can also be in the form of a frame or have another configuration other than that of a plenum, as long as the support member enhances the compressive stress produces by pressure 550 as compared to having no support member.

Figure 19A:
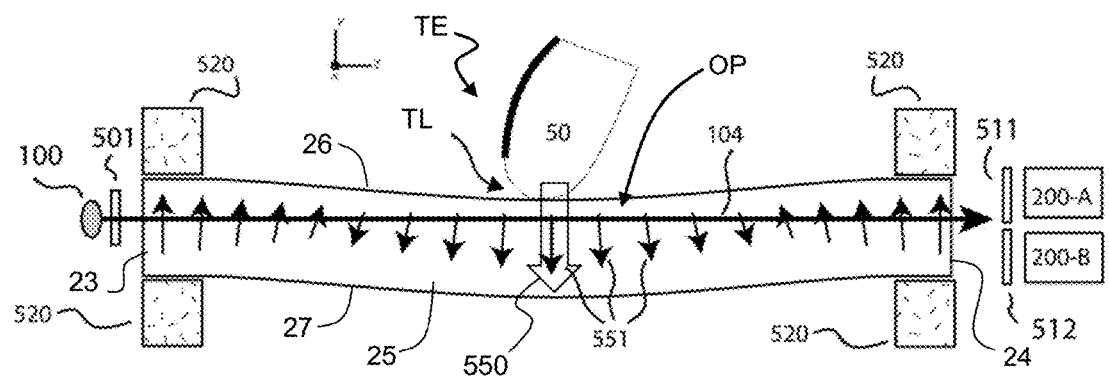
FIGS. 19A-19C are schematic side views of example embodiments of the touch system of FIG. 16, with FIGS. 19B and 19C illustrating an example ion-exchanged waveguide.

FIG. 19A is a schematic cross-sectional view of system 10, wherein two frame-line support members 520 are operably arranged on the upper and lower surfaces 26 and 27 of waveguide 20 near perimeter P (see FIG. 1). The pressure 550 from any touch event TE will predominantly bend waveguide 20 and will lead to compressive and tensile stress over the whole waveguide body 25. The set of vectors 551 shown along optical path OP are representative of the direction of the stress and how it varies over waveguide body 25 due to pressure 550. The retardance from the optical path differences is additive and so tensile and compressive regions will compensate each other.

The compressive stress near the touch location TL will add as vectors to the broader compressive or tensile pressure of the bending of waveguide 20. The relative weighting of the vector summation of the two sources of stress will depend on the constraints provide by the at least one support member 520. The additive nature of the retardance experienced by light beam 104 as it travels over optical path OP produces a continuous change in retardance versus touch pressure.

Glass under no mounting constraints or external pressure will typically have some amount of birefringence from the fabrication of the glass. Localized stress regions can be formed in the process of cooling down the glass into a solid state. Glass used in high-performance imaging systems often requires weeks of annealing to obtain the high degree of homogeneity of index that is needed and resultant the low stress birefringence, which is typically <2 nm/cm. In the near IR, this amount of stress produces 1/100th of a wavelength per 50 mm of path length.

Figure 19B:
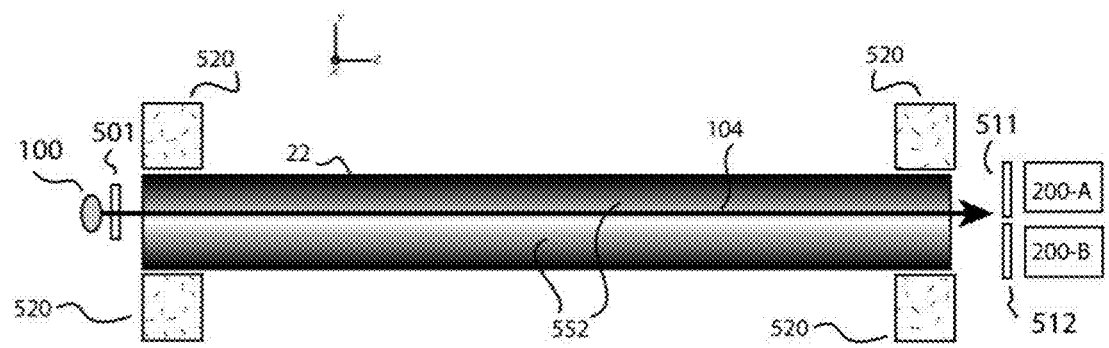
Figure 19C:
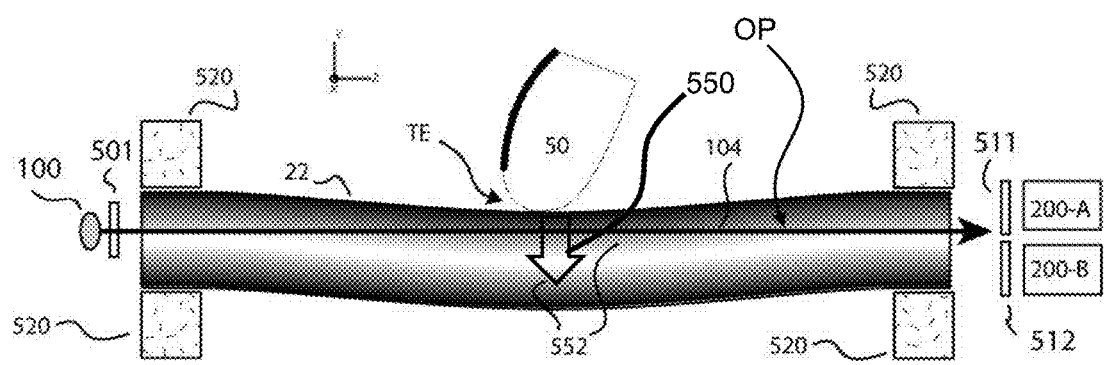

With reference to FIGS. 19B and 19C, stress regions 552 are formed on both the upper and lower sides of a glass plate 20 that is chemically harden by ion exchange. Instead of illustrating the stress distribution by vectors as in FIG. 19A, the darkness of the shading represents the magnitude of the stress, with the darker color indicating greater stress. The difference between FIGS. 19A and 19B is that pressure 550 bends the glass (FIG. 19C), and alters the path of light 104 through a region of higher fabrication-induced stress birefringence. The fabrication-induced stress of regions 552 add by the nature of vectors to the near region compressive stress and the bending stresses. The additive nature of the retardance of beam of light will produce a continuous change in retardance versus touch pressure.

Figure 28B:
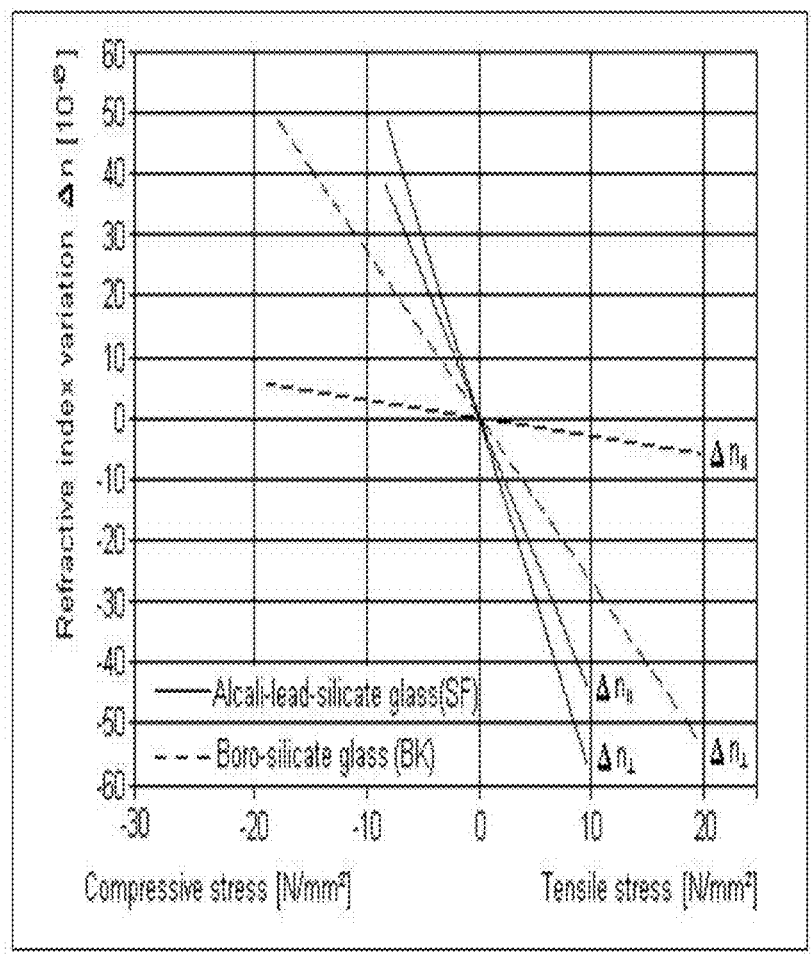

FIGS. 28A through 28C provide supplemental information for the polarization-based embodiments described herein.

Thin Waveguide Region

Figure 20:
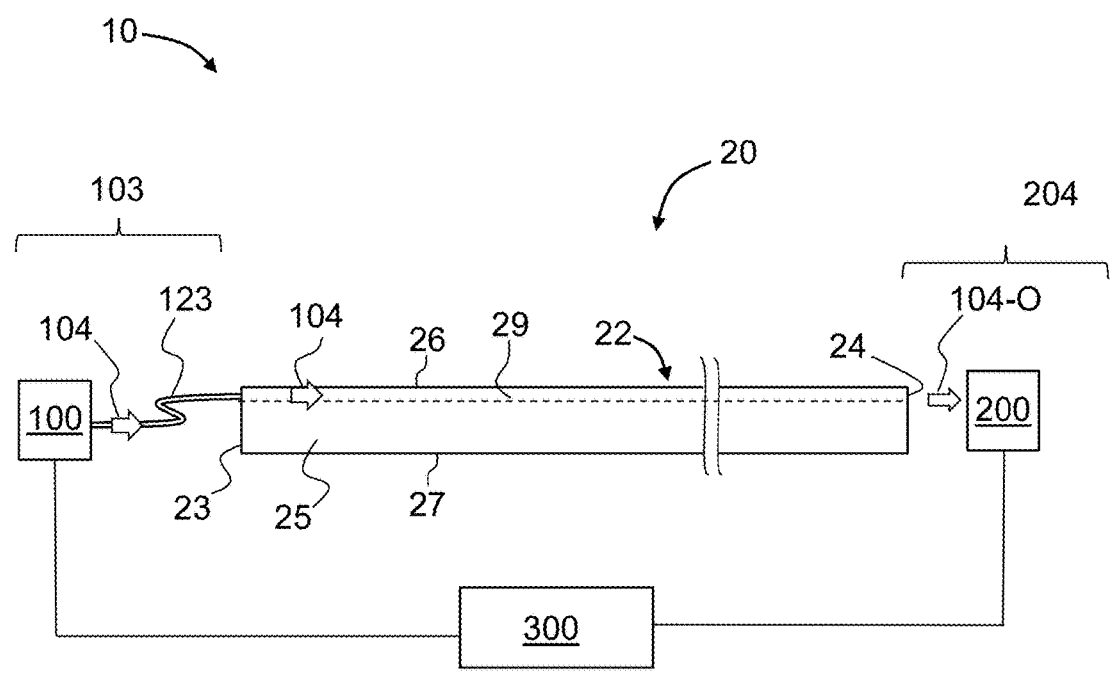
FIG. 20 is a schematic side view of an example touch system similar to that shown in FIG. 3 and FIG. 4A, but wherein the waveguiding region is formed as a thin layer adjacent the upper surface of a glass substrate.

FIG. 20 is a schematic side view of an example touch system 10 wherein waveguide 20 is now in the form of a glass sheet that includes a relatively thin waveguide region 29 adjacent upper surface 22. Waveguide region 29 serves as a relatively thin optical waveguide as compared to the entire bulk of body 25 serving as the waveguide as described in various example embodiment above.

Waveguide region 29 can be formed using ion-exchange or a laminated fusion draw process or any other technique known in the art for forming thin waveguide structures on a substrate. In an example, light source 100 is optically coupled to waveguide region 29 via a section of optical fiber 123 that has one end butt-coupled to the waveguide input end at input edge 23 (hereinafter, waveguide input end 23). Detector 200 is optically coupled with or is otherwise in optical communication with waveguide region 29 at output edge 24 (hereinafter, waveguide output end 24).

Thus, light 104 travels within waveguide region 29 as guided light and it outputted from waveguide output end 24 at output light 104-O. Since waveguide region 29 is much thinner than the bulk waveguide body 25, the light-guiding is best described using electromagnetic theory rather than a geometric light ray approach that ignores diffraction and like effects.

In an experiment based on the configuration of touch system 10 of FIG. 20, a pigtailed laser diode as used as light source 100. Gorilla® glass was used for glass sheet 20 and an ion-exchange process was used to form waveguide region 29. Since the refractive index of the waveguide region is higher than that of body 25, light is guided within waveguide region 29, which defines a thin slab waveguide. Waveguide region 29 had a thickness of about 50 μm, which is much thinner than glass sheet. Thus, waveguide region 29 supports multiple modes, though far fewer modes than when the entirety of the glass sheet is used as a waveguide.

Figure 21:
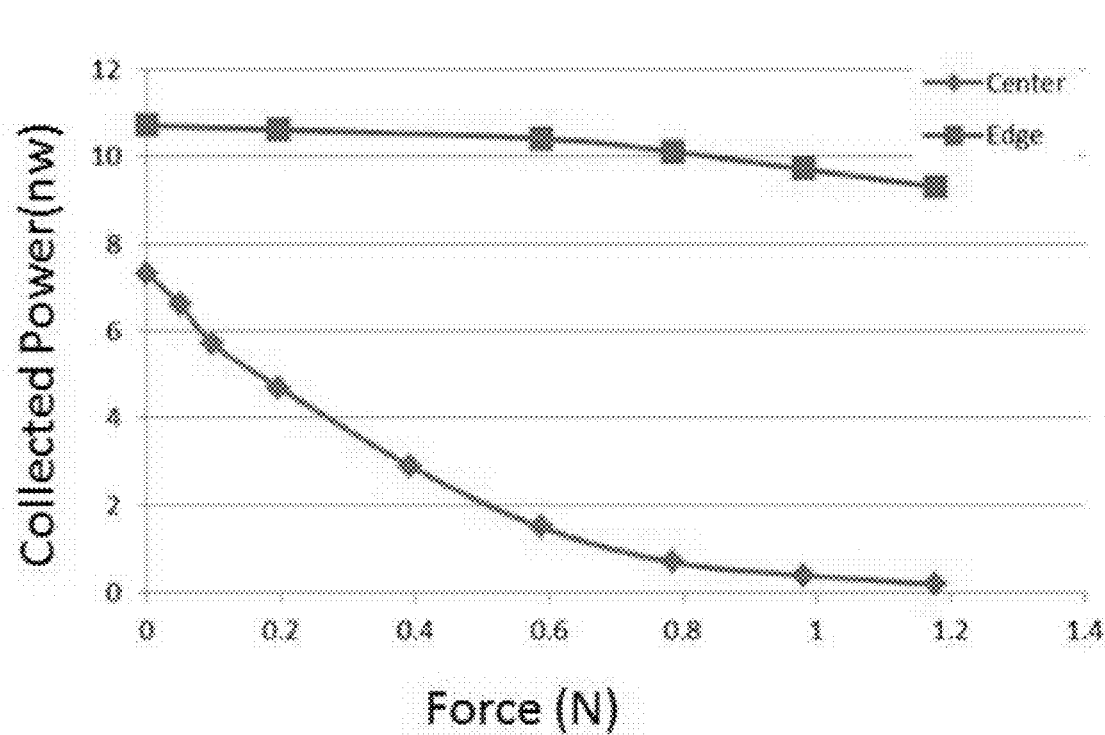
FIG. 21 plots the collected power (nanowatts) vs. the applied force (Newtons) for center and edge touch locations for the example touch system of FIG. 20.

Once a touching force is applied to upper surface 22 of glass sheet 20, the relative phase difference among the different modes traveling within waveguide region 29 are changed. This serves to alter the character of output light 104-O, which in the present instance is representative of an interference pattern. In particular, the light distribution in output light changes. A quantitative relationship between the collected (light) power P (nW) as collected by a multimode fiber versus the magnitude of touching force (Newtons) is plotted in FIG. 21. Light 104 was propagated through the glass center. It is clear that different portions of glass sheet (edge vs. center) have different touching sensitivity, and this difference can be used to determine the touch location TL where the force is applied during a touch event TE.

Figure 22:
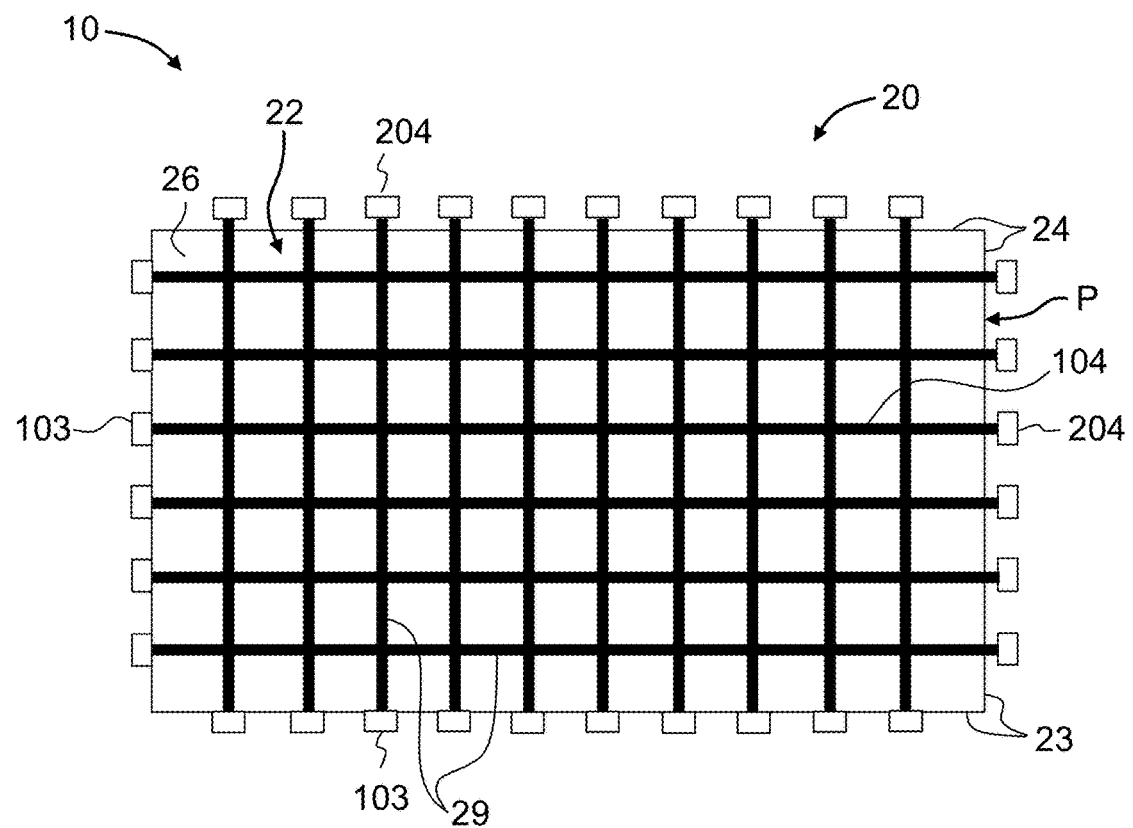
FIGS. 22 and 23 are top-down schematic views of example configurations for touch system 10 wherein channel waveguide regions are formed on a glass sheet.
Figure 23:
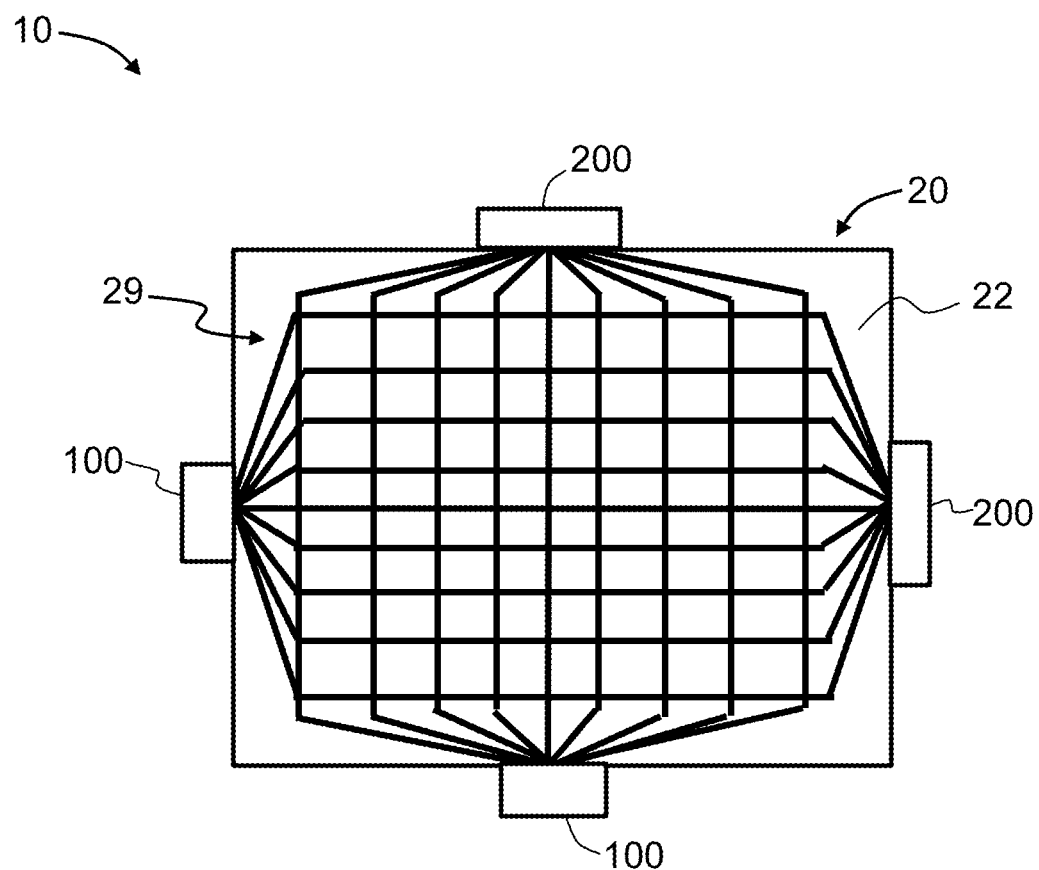

FIG. 22 is a top-down view of an alternate configuration for waveguide regions 29 as formed on glass sheet 20. Rather than being configured as surface slab waveguides, waveguide regions 29 can be configured as channel waveguides, as shown. The channel waveguide regions 29 can be configured sculptured within the glass or atop the glass. FIG. 23 also shows an alternative embodiment for channel waveguide regions 29 that shows two branching networks (fan-outs) associated with two pairs of light sources 100 and detectors 200. It is noted the spacing of the channel waveguide regions 29 need not be uniform and can be concentrated in certain locations that are generally associated with where touch events TE are either more likely to occur or that are designated to occur.

Depending on the particular patter of channel waveguide regions 20, different light sources 100 and detectors 200 can be employed to detect an applied force and the (x, y) touch location TL.

An aspect of the disclosure is utilizing the time response of two or more detectors 200 to identify the touch location TL of a touch event TE. This technique can be used because the deformation of waveguide/glass sheet 20 proceeds outward from the touch location as a function of time. This in turn has a different impact on different optical paths that light rays 104 take through the waveguide. The result is a delay in the detector signals of the two detectors.

Figure 24:
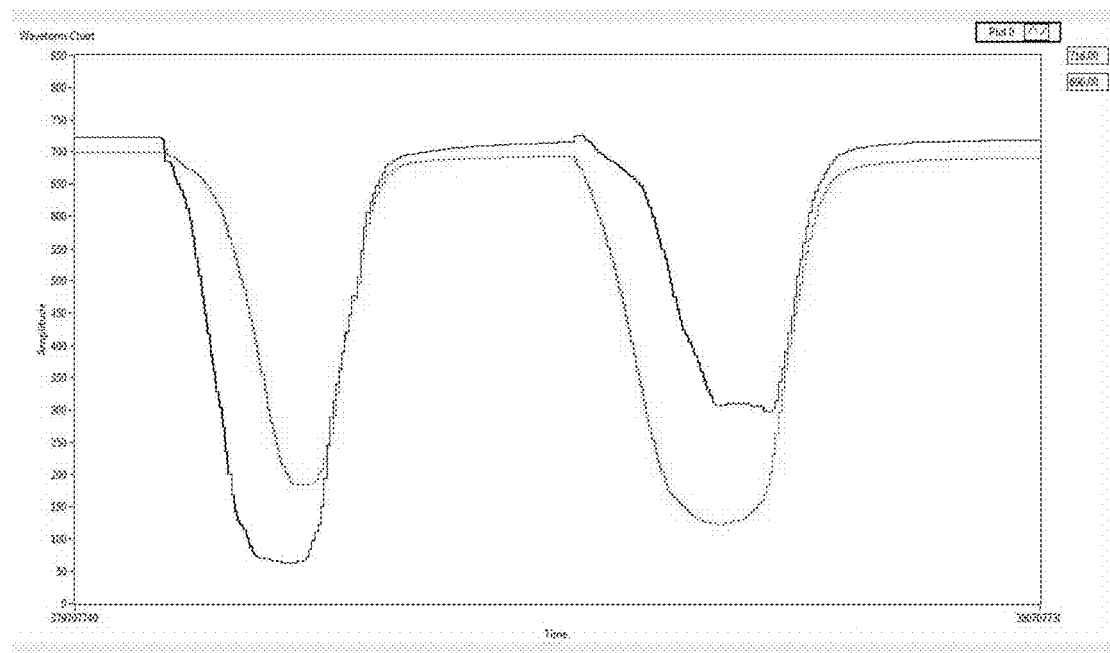
FIG. 24 is a plot of detector signal amplitude versus time for two different touch event locations, illustrating how there is a measurable time lag between the detector signals for the different touch locations, thereby providing a means for determining the touch event location.

FIG. 24 plots the amplitude AMP of the detector signal (arbitrary units) vs. time t for two different detectors (A and B in the plot) for two different touch events TE at different locations on the waveguide/glass sheet 20. The time lag between the A and B signals can be correlated with different locations on waveguide/glass sheet 20. The optical path closest to the touch event location TL responds first, giving rise to the time lag in detector signals. Thus, in an example embodiment, controller 300 includes information about various time lags associated with detector signals for various detectors 200 as a function of possible touch locations TL. In another example, controller 300 is configured to calculate the touch location TL based on the information in one or more detector signals.

Pressure Sensing Display System

Figure 25A:
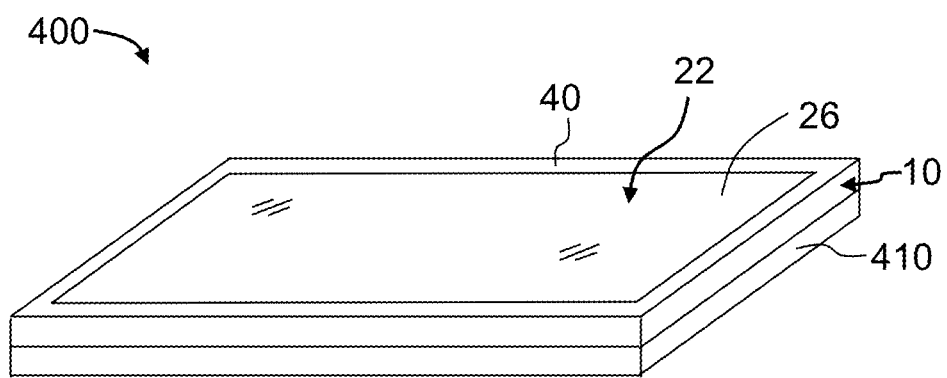
FIG. 25A is an elevated view of an example pressure-sensing display system that shows the touch system disclosed herein interfaced with a display unit.

FIG. 25A is a schematic elevated view of an example pressure-sensing display 400 formed by operably arranging touch system 10 adjacent and above (e.g., atop) a conventional display unit 410, such as a liquid crystal display, which display may have conventional position-based sensing capability. Touch system 10 can be any of the embodiments described herein.

Figure 25B:
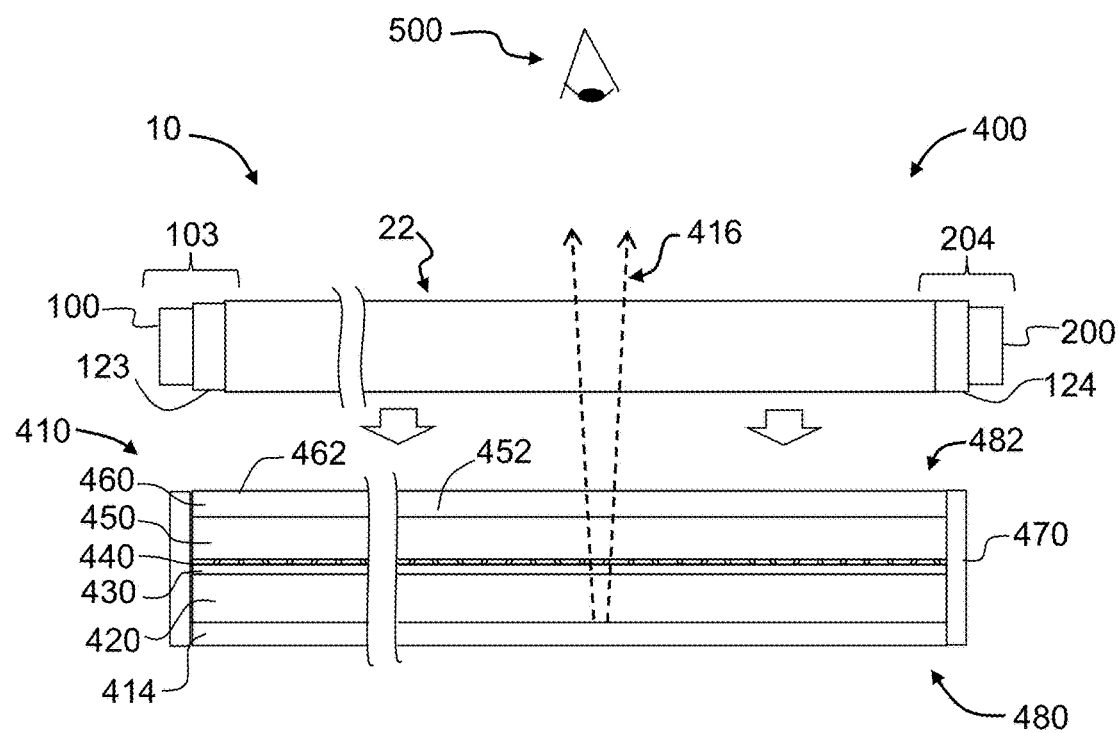
FIG. 25B is a cross-sectional view of the pressure-sensing display system of FIG. 16A.

FIG. 25B is a schematic cross-sectional, partial exploded view of an example touch-sensitive display 400 illustrating an example of how to integrate touch system 10 with conventional display unit 410. The conventional display unit 410 is shown in the form of a liquid crystal display that includes a backlighting unit 414 that emits light 416, a thin-film transistor (TFT) glass layer 420, a liquid crystal layer 430, a color filter glass layer 450 with a upper surface 452, and a top polarizer layer 460 with a upper surface 462, all arranged as shown. A frame 470 is disposed around the edge of color filter glass layer 450. Light source 100 is shown by way of example as being operably supported within frame 470. This forms an integrated display assembly 480 having a top side 482.

To form the final touch-sensitive display 400, assembly 20 is added to integrated display assembly 480 of conventional display unit 410 by operably disposing the assembly on top side 482. The assembly 20 can include the aforementioned cover 40 in the form of an IR-transparent but visibly opaque layer disposed adjacent light source 100 and detector 200.

In an example, various indicia or indicium (not shown) such as a keyboard (not shown) may be presented to user 500 on or through upper surface 26 to guide the user to interact with touch system 10. By way of example, the indicium may include areas on upper surface 26 of waveguide 22 that are set aside for indicating user choices, software execution, etc., or to indicate a region where the user should create touch event TE. Such region, for example, might be required where light 104 does not reach certain portions of upper surface 26.

Estimating the Applied Force of a Touch Event Via Fringe Detection

In some applications of touch system 10, as the applied force (pressure) at touch location TL is increased, the at least one detector 200 may not respond uniformly (smoothly) to the intensity changes in output light 104-O. Accordingly, aspects of the disclosure are directed to estimating the applied force in such cases using various embodiments and configurations for the detection of output light 104-O.

Figure 26A:
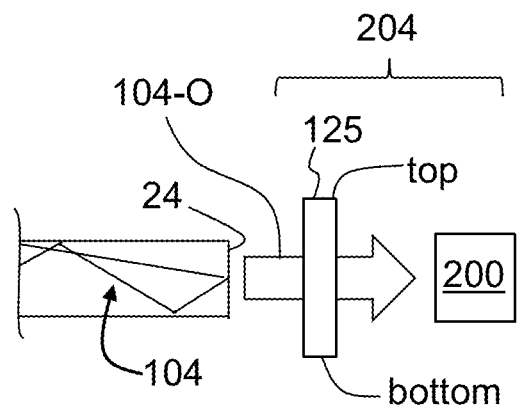
FIG. 26A is a cross-sectional view of the detector end of an example touch system that includes a sloped attenuator disposed adjacent the detector.
Figure 26B:
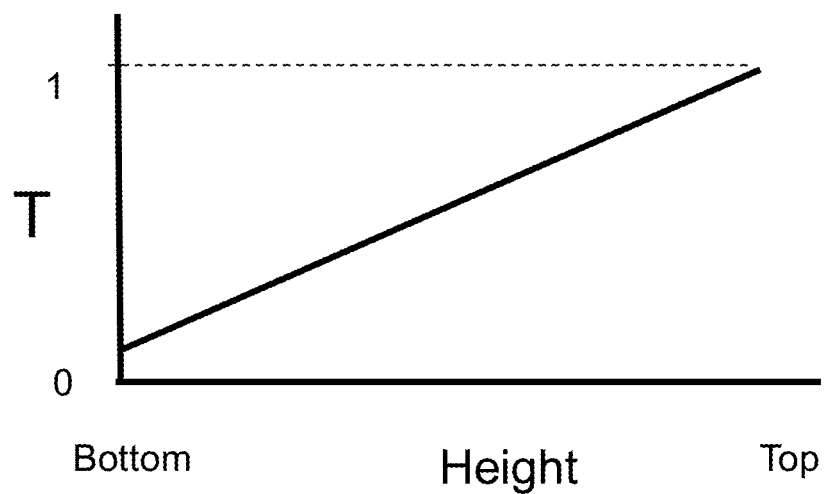
FIG. 26B is an example plot of the normalized transmission T vs. attenuation filter height, showing an example filter attenuation profile.

In an example embodiment illustrated in FIGS. 26A and 26B, touch system 10 can include a sloped attenuation filter (attenuator) 125 in front of detector 200. Sloped attenuator 125 can be formed from glass configured with an attenuation that changes uniformly from the bottom edge to top edge. FIG. 26B is an example plot of the transmission T vs. height of attenuator 125. Since the overall power hitting the light-sensitive area of the detector 200 is substantially constant, the sloped attenuation will cause that detector signal SD to change with the vertical "center of mass" of output light 104-O. This allows for the detector signal SD to be correlated with applied pressure.

In some cases, the detector response to the applied pressure at the touch location may not be completely monotonic. For example, the image can move in one direction until the pressure reaches certain amount and then jump to the other edge of glass (detector). Since the monotonic range is not too small and touch force does not change instantly, an aspect of the disclosure includes performing a method to "unwrap" the measurements.

The method assumes that the detector signal SD is sampled sufficiently fast, e.g., 60 Hz or faster and the force is reasonably large (e.g., 100 g) and applied monotonically vs. impulsively. Also:

Whenever capacitive touch senses no touches, reset accumulated measure value to 0.

If new position is reasonable close to old position, one can use new position as valid measurement. If old position was close to end of monotonic range, and new position jumps to other end of range, add entire range to most recent measurement.

If old position was close to beginning of monotonic range and we have estimate bigger than one range, and new position jumps to other end of range, subtract entire range to obtain most recent estimate.

Another aspect of the disclosure employs fringe-motion detection. Since the fringes in output light 104-O tend to move uniformly with pressure, one can employ a vertical stripe (linear array) of CMOS or CCD cells. It would be sufficient to use few tens of cells. A typical 2D array pixel-based detector 200 has thousands of cells. The linear array detector 200 can provide a vertical intensity profile of output light 104-O. The intensity profile has two components: One is slow changing that typically has one or two peaks, while the second represents fast changing fringes.

In an example embodiment, a filter is used to eliminate the slow-changing component. The remaining fast-changing component shows peaks corresponding to fringes. If the fringe profile is sampled fast enough (e.g., 60 Hz), the difference in phase between consecutive frames can be computed. Integrating the differences yields a detector signal SD that is representative (e.g., proportional) to the applied pressure at the touch location TL.

Thus, example detector measurement configurations and methods include the following performed during a touch event where pressure is being applied at a touch location TL:

Integrate total power (equivalent of large area detector). Call this configuration TOTAL Integrate small area in the middle of image (equivalent of small pinhole1). Call this configuration PINHOLE1

Integrate small area just above middle of image (equivalent of small pinhole2). Call this configuration PINHOLE2.

Integrate large area with attenuation vertical change 20:1 (largest attenuation at top of image). Call this SLOPE1 configuration.

Integrate large area with attenuation vertical change 20:1 (largest attenuation at bottom of image). Call this SLOPE2 configuration.

Figure 27A:
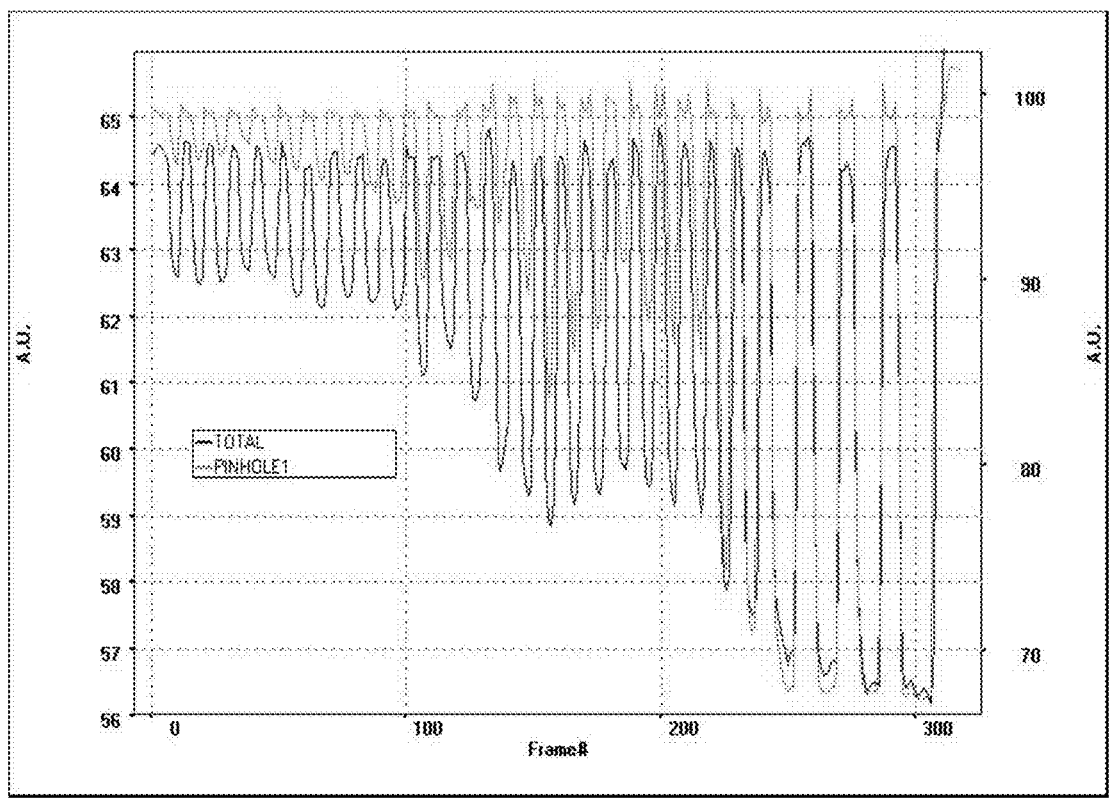
FIGS. 27A through 27D are plots of the detector signal versus frame number (#) for four different detector configurations used to detect fringes in the output signal to determine the amount of pressure being applied at the touch location.

FIG. 27A is a plot of the detector signal SD (arbitrary units) vs. frame # F for the total integrated power, i.e., TOTAL signal (blue) and an integrated power of a small area in the middle of the detector, i.e., PINHOLE 1 signal (orange).

Figure 27B:
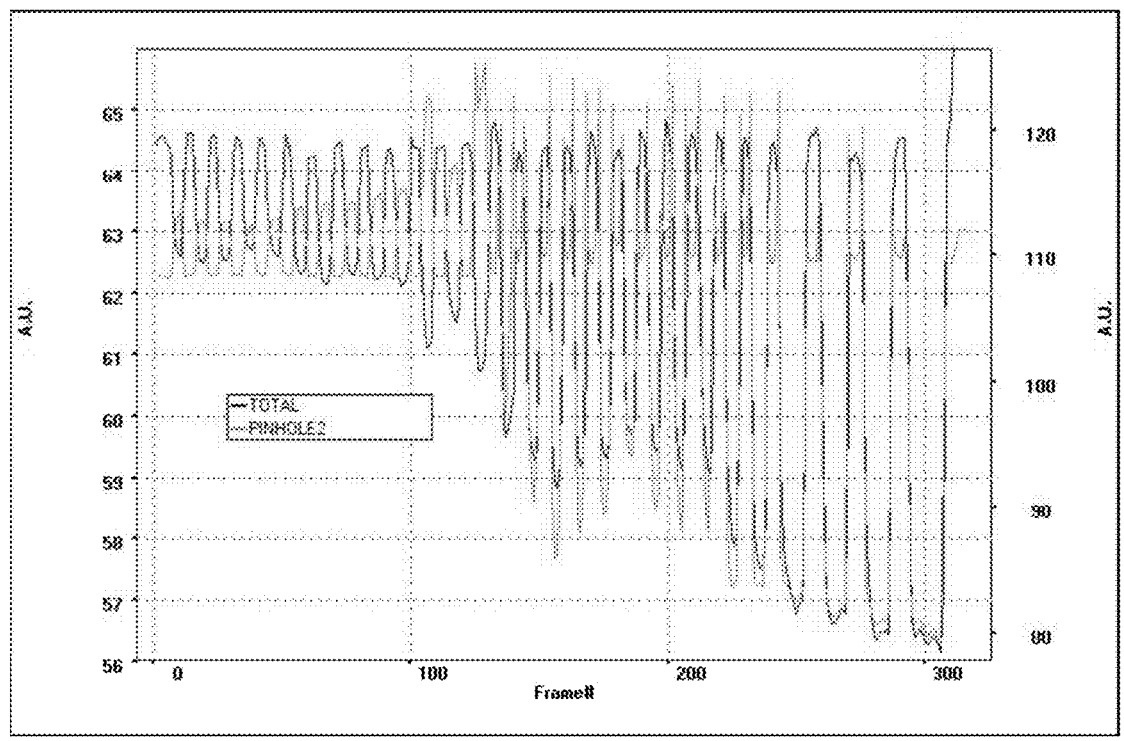

FIG. 27B is a plot of the detector signal SD (arbitrary units) vs. frame # for the total integrated power, i.e., TOTAL signal (blue) and an integrated power of a small area just above the middle of the detector, i.e., PINHOLE 2 signal (orange).

Figure 27C:
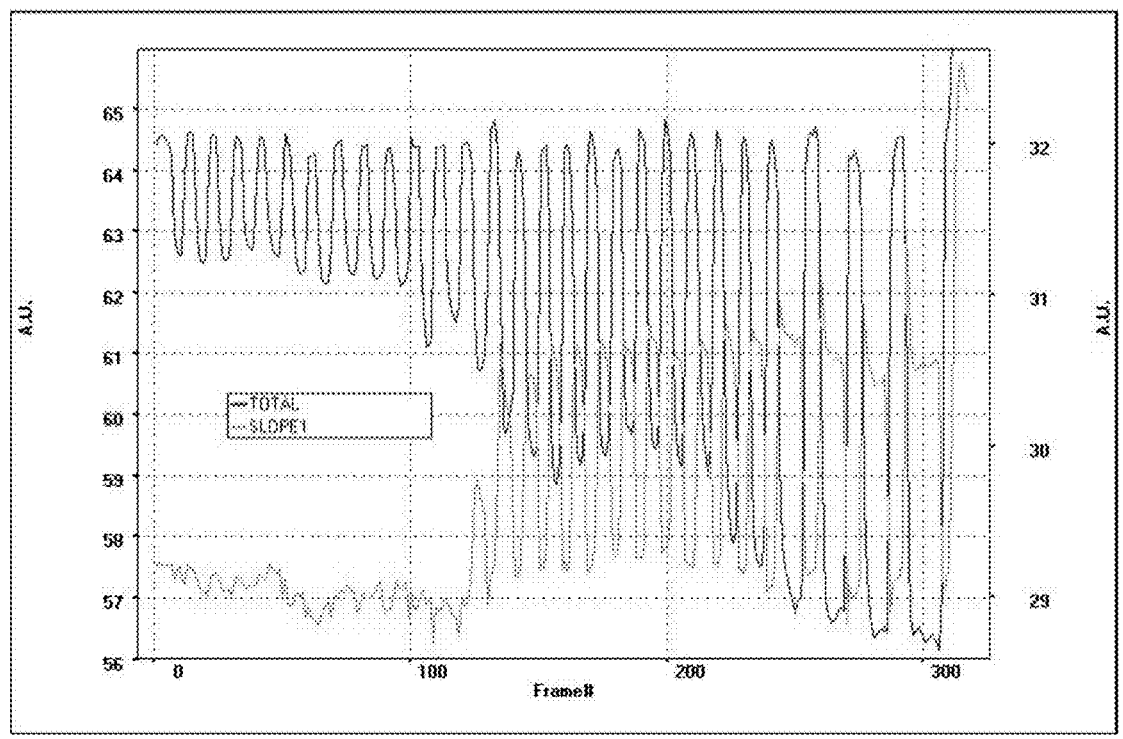

FIG. 27C is a plot of the detector signal SD (arbitrary units) vs. frame # for the total integrated power, i.e., TOTAL signal (blue) and signal with linear attenuation filter (high attenuation at top of image), i.e., SLOPE 1 (orange).

Figure 27D:
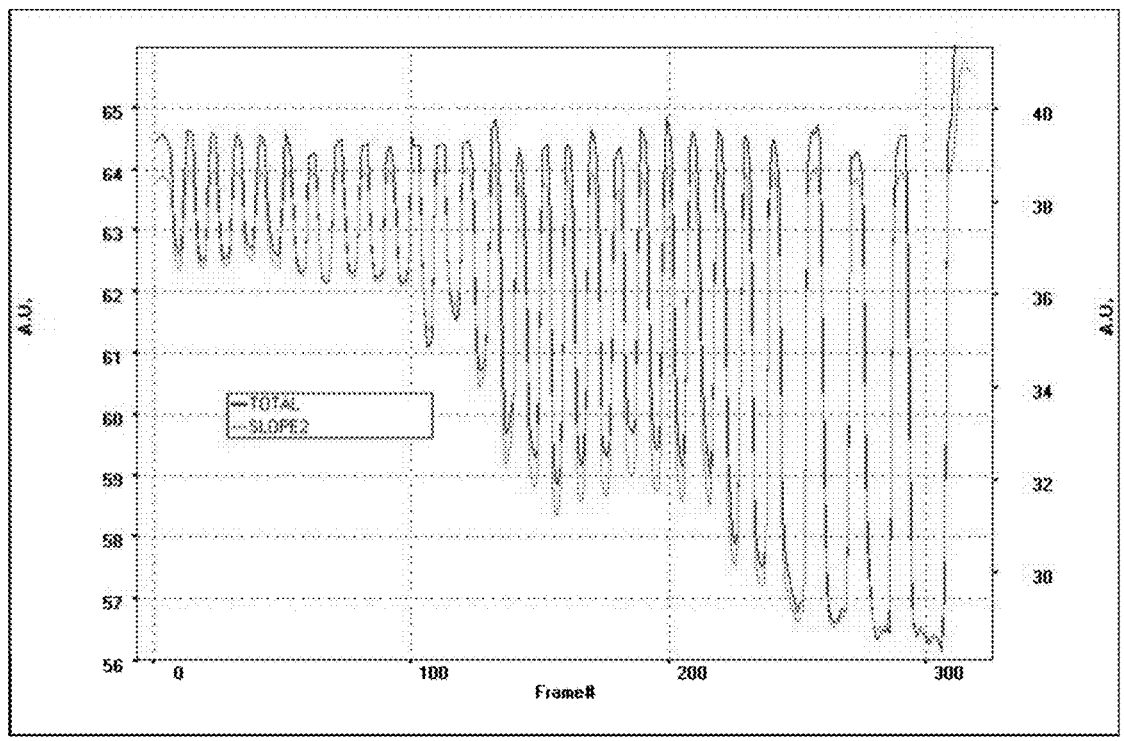

FIG. 27D is a plot of the detector signal SD (arbitrary units) vs. frame # for the total integrated power, i.e., TOTAL signal (blue) and signal with linear attenuation filter (high attenuation at bottom of image), i.e., SLOPE 1 (orange).

Of the four different signal plots of 27A through 27D, SLOPE2 and then PINHOLE1 are suitable candidates for use in assessing amounts of applied pressure at the touch location. Also, the PINHOLE signals are location sensitive and so can be used to determine the position of the touch location TL.

Although the embodiments herein have been described with reference to particular aspects and features, it is to be understood that these embodiments are merely illustrative of desired principles and applications. It is therefore to be understood that numerous modifications may be made to the illustrative embodiments and that other arrangements may be devised without departing from the spirit and scope of the appended claims.

What is claimed is:

1. A pressure-sensing touch system for detecting a touch event caused by the application of an amount of pressure at a touch location, comprising:

a waveguide defined by a transparent sheet having a body, an upper surface, a lower surface, an input edge and an output edge, wherein the transparent sheet is bendable when pressure is applied at the touch location;

a light source system in optical communication with the input edge of the transparent sheet and configured to introduce coherent light of a select operating wavelength into the body of the transparent sheet to define coherent output light of the select operating wavelength at the output edge of the transparent sheet, wherein the coherent light travels through and within the body of the transparent sheet from the input edge to the output edge and over multiple optical paths associated with multiple guided modes each having a relative phase, wherein the coherent output light has an associated spatial intensity distribution due to an interference as defined by the relative phases of the guided modes, and where bending the transparent sheet from the application of the amount of pressure causes a change in the relative phases of the guided modes, which in turn causes a change in the spatial intensity distribution of the coherent output light due to the interference;

a detector system in optical communication with the output edge of the transparent sheet and configured to detect at least a portion of the coherent output light of the select operating wavelength that exits the output edge of the transparent sheet and detect the change in the spatial intensity distribution upon bending the transparent sheet, and in response thereto generate a detector signal; and a controller operably connected to and configured to control the operation of the light source system and the detector system, and further configured to process the detector signal to determine whether the touch event has occurred and a pressure at the touch location.

2. The pressure-sensing touch system of claim 1, wherein the transparent sheet has a thickness in a range from 0.05 mm to 1.5 mm.

3. The pressure-sensing touch system of claim 2, wherein the transparent sheet consists of a glass that is substantially transparent to the light from the light source.

4. The pressure-sensing touch system of claim 1, where the light source system includes multiple light sources and the detector system includes multiple detectors.

5. The pressure-sensing touch system of claim 1, wherein the transparent sheet has a thickness and wherein the detector system includes at least one detector and at least one aperture arranged adjacent the at least one detector, wherein the at least one aperture has a dimension that is smaller than the thickness of the transparent sheet.

6. The pressure-sensing touch system of claim 1, wherein the transparent sheet has a thickness and wherein the detector system includes at least one detector having a photosensitive area that is smaller in at least one direction than the thickness of the transparent sheet.

7. The pressure-sensing touch system of claim 1, wherein the light source system includes an input optical system having one of an input optical fiber, an input prism, an input grating and an angled input edge, and wherein the detector system includes an output optical system having one of output optical fiber, an output prism, an output grating and an angled output edge.

8. The pressure-sensing touch system of claim 1, wherein the detector system includes at least one detector operably arranged on the upper surface of the transparent sheet adjacent the output edge.

9. The pressure-sensing touch system of claim 8, wherein the detector system includes at least one detector operably arranged on the lower surface of the transparent sheet adjacent the output edge, wherein the detectors on the upper and lower surface are arranged to provide respective detector signals that are out of phase.

10. A display system that has pressure-sensing capability, comprising:
the pressure-sensing touch system according to claim 1; and
a display unit having a display, with the pressure-sensing touch system operably arranged adjacent the display.

11. The display system of claim 10, wherein the display unit has a display that includes one of capacitive and resistive touch-sensing capability.

12. The display system of claim 10, wherein the waveguide is epoxy bonded to the display unit, with the epoxy having a refractive index lower than that of the waveguide.

13. The pressure-sensing touch system of claim 1, wherein the light source has a divergence lower than 5 degrees in at least one direction.

14. The pressure-sensing touch system of claim 1, wherein the light source includes an LED or a VCSEL.

15. The pressure-sensing touch system of claim 1, wherein the light source emits light of a select polarization, and wherein the detector system includes a detector polarizer, and wherein the detector signal is representative of an amount of induced birefringence in the body of the transparent sheet caused by said application of pressure at the touch location.

16. The pressure-sensing touch system of claim 15, wherein the light source includes a source polarizer so that the light source emits said light of said select polarization.

17. The pressure-sensing touch system of claim 16, wherein the detector system includes first and second detector polarizers operably arranged relative to first and second detectors, respectively.

18. The pressure-sensing touch system of claim 15, further comprising at least one support member configured to support the transparent sheet to facilitate the formation of said induced birefringence within the body of the transparent sheet.

19. The pressure-sensing touch system of claim 1, wherein the change in the spatial intensity distribution in the output coherent light includes the movement of intensity fringes caused by the interference between the guided modes and the change in the relative phases of the guide modes, and wherein the detector detects the movement of the intensity fringes to determine the amount of pressure associated with the touch event.

20. The pressure-sensing touch system of claim 19, further including an aperture arranged adjacent the detector to make the detection aperture limited.

21. The pressure-sensing touch system of claim 19, further including a sloped attenuator arranged adjacent the detector to make the detection of output light position-sensitive on the detector.

22. The pressure-sensing touch system of claim 1, wherein:
the light source emits the coherent light having a polarization state,
the detector system includes a detector polarizer, and
the detector signal is representative of an amount of change in the polarization state from the polarized coherent light traveling over different optical paths through different birefringent regions of the body of the transparent sheet caused by said application of pressure at the touch location.

23. The pressure-sensing touch system of claim 22, wherein the transparent sheet is made of glass, and wherein the change in the polarization state is from induced birefringence in the transparent sheet and the change of the optical path of the polarized coherent light through different regions of existing birefringence that are formed in the fabrication of the transparent sheet.

24. The pressure-sensing touch system of claim 1, wherein:
the transparent sheet comprises glass;
the light source emits light of a select polarization state; and
the detector system includes multiple detectors with different polarizing optics in front of each detector that allow the detection of the polarization state of the emitted light from the glass transparent sheet.

25. The pressure-sensing touch system of the claim 24, wherein one or more of the following is detected:
a magnitude of retardance from the input polarization;
a retardance from the input polarization;
a percentage of the light that is polarized; and
a magnitude of the intensity of the emitted light from the glass.

26. A method of sensing an application of pressure for a touch event at a touch location on a flexible transparent sheet having a body, comprising:
sending coherent light of a select operating wavelength over multiple optical paths through and within the body of the transparent sheet from an input edge to an output edge of the flexible transparent sheet to form output light having the select operating wavelength and a spatial intensity distribution at the output edge, wherein the spatial intensity distribution is defined by an interference of multiple guided modes respectively defined by the multiple optical paths and having relative phases;
flexing the transparent sheet by applying pressure to the transparent sheet, thereby causing a change in the multiple optical paths to cause a change in the relative phases of the multiple guided modes, which in turn causes a change in the spatial intensity distribution of the output light by changing the interference;

detecting the change in the spatial intensity distribution and generating a detector signal representative thereof; and processing the detector signal to associate the change in the spatial intensity distribution with the application of pressure at the touch location.

27. The method of claim 26, wherein detecting the change in the spatial intensity distribution includes detecting the output light in a near-field relative to the output edge.

* * * * *

UNITED STATES PATENT AND TRADEMARK OFFICE
CERTIFICATE OF CORRECTION

PATENT NO.         : 10,228,799 B2
APPLICATION NO.    : 15/591528
DATED              : March 12, 2019
INVENTOR(S)        : Minghan Chen et al.

Page 1 of 1

It is certified that error appears in the above-identified patent and that said Letters Patent is hereby corrected as shown below:

On the Title Page

On the Page 3, Column 1, item (56), other publications, Line 8, delete "Sysmetrical" and insert -- Symmetrical --, therefor.

Signed and Sealed this
Twenty-seventh Day of August, 2019

Andrei Iancu
*Director of the United States Patent and Trademark Office*